(12) United States Patent
Woicekowski et al.

(10) Patent No.: US 10,515,558 B2
(45) Date of Patent: *Dec. 24, 2019

(54) RETROSPECTIVE ANALYSIS OF VEHICLE OPERATIONS

(71) Applicant: THE BOEING COMPANY, Chicago, IL (US)

(72) Inventors: Michael J. Woicekowski, Montreal (CA); Alejandro Oswaldo Hernandez Romero, Montreal (CA); Oleksandr Basanets, Montreal (CA)

(73) Assignee: THE BOEING COMPANY, Chicago, IL (US)

(*) Notice: Subject to any disclaimer, the term of this patent is extended or adjusted under 35 U.S.C. 154(b) by 55 days.

This patent is subject to a terminal disclaimer.

(21) Appl. No.: 15/464,071

(22) Filed: Mar. 20, 2017

(65) Prior Publication Data
US 2017/0337825 A1 Nov. 23, 2017

Related U.S. Application Data

(63) Continuation of application No. 14/793,517, filed on Jul. 7, 2015, now Pat. No. 9,601,021.

(51) Int. Cl.
| | |
|---|---|
| *G08G 5/00* | (2006.01) |
| *G06Q 10/04* | (2012.01) |
| *G06Q 10/06* | (2012.01) |
| *G06Q 10/08* | (2012.01) |
| *G06Q 10/10* | (2012.01) |

(52) U.S. Cl.
CPC ........... *G08G 5/0043* (2013.01); *G06Q 10/04* (2013.01); *G06Q 10/06* (2013.01); *G06Q 10/08* (2013.01); *G06Q 10/109* (2013.01)

(58) Field of Classification Search
CPC ............................... G08G 5/043; G06Q 10/04
See application file for complete search history.

(56) References Cited

U.S. PATENT DOCUMENTS

| | | | | |
|---|---|---|---|---|
| 4,241,403 A | * | 12/1980 | Schultz | ................ G07C 5/085 |
| | | | | 701/32.5 |
| 5,825,283 A | * | 10/1998 | Camhi | ................ B60R 25/102 |
| | | | | 340/438 |

(Continued)

FOREIGN PATENT DOCUMENTS

| | | |
|---|---|---|
| CN | 104750950 A | 7/2015 |
| EP | 3115940 A1 | 1/2017 |

OTHER PUBLICATIONS

European Search Report for EP 16166579.9, dated Jul. 4, 2016.

(Continued)

*Primary Examiner* — Alex C Dunn
(74) *Attorney, Agent, or Firm* — Patterson + Sheridan, LLP

(57) ABSTRACT

Method and apparatus for generating and outputting dynamic variance reports for vehicle operations. The dynamic variance reports enable a vehicle operations scheduler to understand trends, patterns, or the like in variances between planned vehicle operations and actual vehicle operations. The understanding of the variances provided by the dynamic variance reports enable the scheduler to apply buffers to vehicle operations plans so that planned vehicle operations more closely match actual vehicle operations and crew assignments are less likely to be disrupted.

24 Claims, 12 Drawing Sheets

(56) References Cited

U.S. PATENT DOCUMENTS

| | | | |
|---|---|---|---|
| 7,015,830 B2* | 3/2006 | Flick | B60R 25/04 |
| | | | 340/989 |
| 8,255,097 B1 | 8/2012 | Wander | |
| 9,601,021 B2 | 3/2017 | Woicekowski et al. | |
| 2002/0077985 A1* | 6/2002 | Kobata | G06F 21/10 |
| | | | 705/51 |
| 2010/0280700 A1* | 11/2010 | Morgal | G06Q 10/02 |
| | | | 701/31.4 |
| 2011/0246002 A1 | 10/2011 | Shavit | |
| 2013/0132013 A1 | 5/2013 | Wilson | |
| 2014/0046570 A1* | 2/2014 | Mohn | G08G 1/00 |
| | | | 701/99 |
| 2015/0149020 A1* | 5/2015 | Smith | B60W 40/09 |
| | | | 701/23 |
| 2016/0092823 A1* | 3/2016 | Woicekowski | G06Q 10/06311 |
| | | | 705/7.15 |
| 2016/0092846 A1* | 3/2016 | Romero | G06Q 10/1097 |
| | | | 705/7.21 |

OTHER PUBLICATIONS

Chinese Office Action for Application No. 201610536519.0 dated Oct. 31, 2018.

European Requistion for Application No. 2,928,175 dated Jan. 21, 2019.

Raymond A. Young, "Examination of air transportation trip time variability", The Graduate College (University of Nevada, Las Vegas), URL:<https://digitalscholarship.unlv.edu/cgi/viewcontent.cgi?article=38608,context=rtds>, Dec. 2008 (Dec. 2008).

* cited by examiner

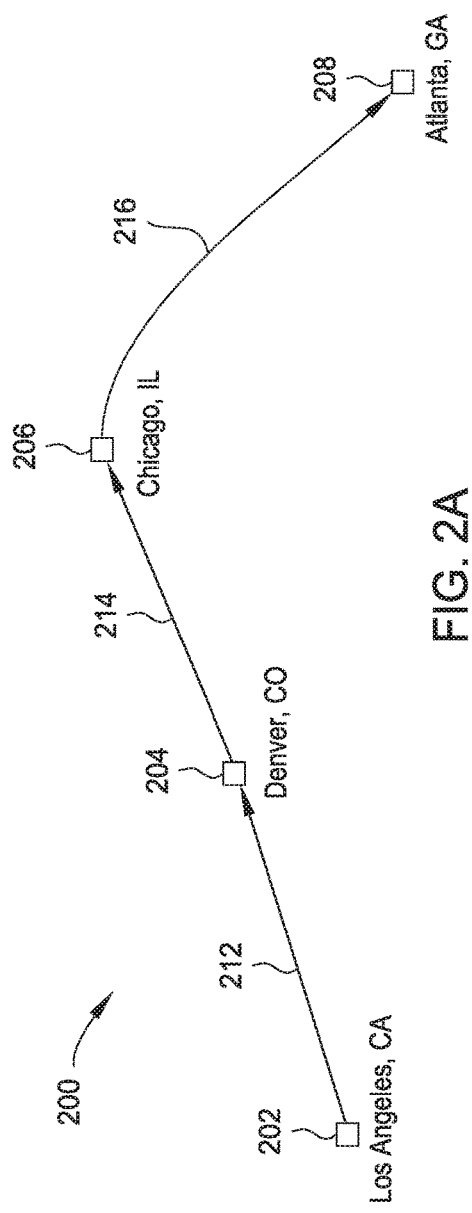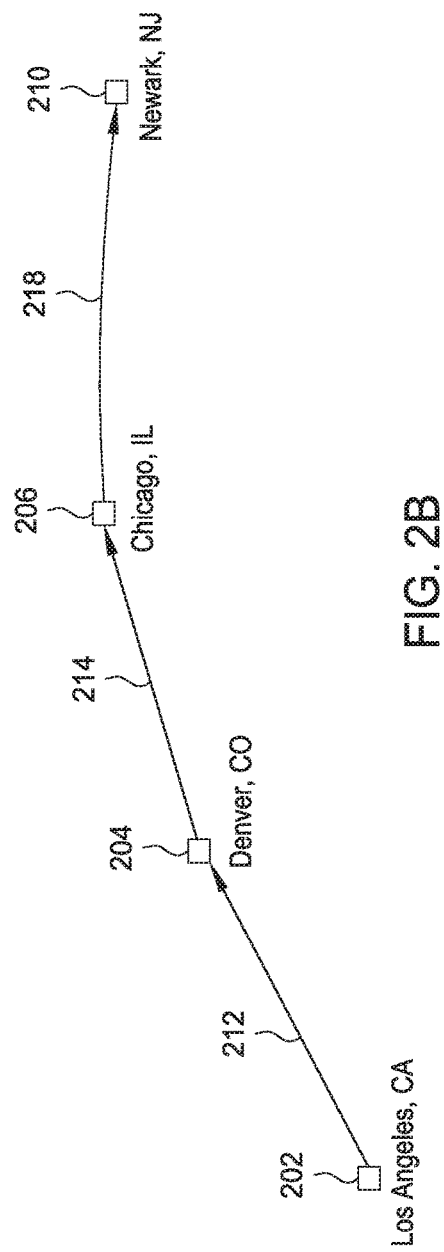
FIG. 2A
FIG. 2B

RETROSPECTIVE ANALYSIS OF VEHICLE OPERATIONS

CROSS-REFERENCE TO RELATED APPLICATIONS

This application is a continuation of co-pending U.S. patent application Ser. No. 14/793,517, filed Jul. 7, 2015, which issued on Mar. 21, 2017 as U.S. Pat. No. 9,601,021. The aforementioned related patent application is herein incorporated by reference in its entirety.

BACKGROUND

Aspects described herein relate to vehicle operation planning, and more specifically, to generating dynamic reports that enable improved scheduling of vehicles and vehicle operators.

SUMMARY

According to one aspect, a computer-implemented method includes storing electronic data for actual vehicle operations and planned vehicle operations in a data structure on a computer-readable medium. The actual and planned vehicle operations data includes data for different vehicle operations and the data for the different vehicle operations includes multiple instances of the different vehicle operations. The computer-implemented method includes calculating at least one variance for at least one personnel time limit criterion for the multiple instances of the different vehicle operations, based on one or more differences between the actual vehicle operations data and the planned vehicle operations data. The computer-implemented method also includes generating at least one electronic dynamic variance report based on the calculated at least one variance and based on the at least one user-adjustable criterion.

According to one aspect, a computer program product for generating dynamic reports related to vehicle operations includes a computer-readable storage medium having computer-readable program code embodied therewith. The computer-readable program code is executable by one or more computer processors to store electronic data for actual vehicle operations and planned vehicle operations in a data structure on a computer-readable medium. The the actual and planned vehicle operations data includes data for different vehicle operations and the data for the different vehicle operations includes multiple instances of the different vehicle operations. The computer-readable program code is also executable to calculate at least one variance for at least one personnel time limit criterion for the multiple instances of the different vehicle operations, based on the actual vehicle operations data and planned vehicle operations data. The computer-readable program code is also executable to generate at least one dynamic variance report based on the calculated at least one variance and based on the at least one user-adjustable criterion.

According to one aspect, a system includes a data structure on a computer-readable medium storing data related to planned vehicle operations and actual vehicle operations. The actual and planned vehicle operations data includes data for different vehicle operations and the data for the different vehicle operations includes multiple instances of the different vehicle operations. The system also includes at least one input device configured to receive at least one user-adjustable criterion. The system also includes a display device. The system also includes a processor in communication with the data structure, the at least one input device, and the display device. The processor is configured to retrieve the actual vehicle operations data and the planned vehicle operations data from the data structure. The processor is also configured to calculate at least one variance for at least one personnel time limit criterion for the multiple instances of the different vehicle operations, based on differences between the actual vehicle operations data and the planned vehicle operations data. The processor is also configured to output to the display device a first at least one dynamic variance report based on the calculated at least one variance and based on the at least one user-adjustable criterion.

BRIEF DESCRIPTION OF THE SEVERAL VIEWS OF THE DRAWINGS

FIG. 2A is a schematic depiction of a planned itinerary for an aircraft;

FIG. 2B is a schematic depiction of the actual itinerary flown by the aircraft of FIG. 2A;

DETAILED DESCRIPTION

In the following, reference is made to aspects presented in this disclosure. However, the scope of the present disclosure is not limited to specific described aspects. Instead, any combination of the following features and elements, whether related to different aspects or not, is contemplated to implement and practice contemplated aspects. Furthermore, although aspects disclosed herein may achieve advantages over other possible solutions or over the prior art, whether or not a particular advantage is achieved by a given aspect is not limiting of the scope of the present disclosure. Thus, the following aspects, features, and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

In various industries, assigning personnel (e.g., employees) to tasks or jobs can be limited by personal limits for the personnel. For example, commercial airline pilots have several different personal limits related to the length of time they can be on duty that can limit how the pilots can be assigned to different flight segments.

Figure 1A:
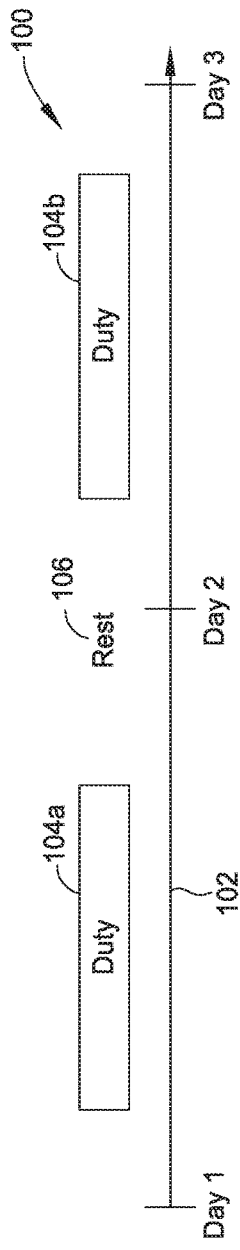
FIG. 1A is a block diagram illustrating an exemplary duty schedule for a pilot over a two-day period.

FIG. 1A illustrates a two-day timeline 102 of an exemplary duty scenario 100 for a pilot of commercial aircraft. In the scenario 100, the pilot has a first duty period 104a during a first day and a second duty period 104b during a second day. The first duty period 104a and the second duty period 104b are separated by a rest period 106. Government regulations (e.g., Federal Aviation Administration regulations), airline regulations, union rules, and the like may dictate personal limits for how long the duty periods 104a and 104b can be and may also dictate how long the rest period 106 between the two duty periods 104a and 104b needs to be.

Figure 1B:
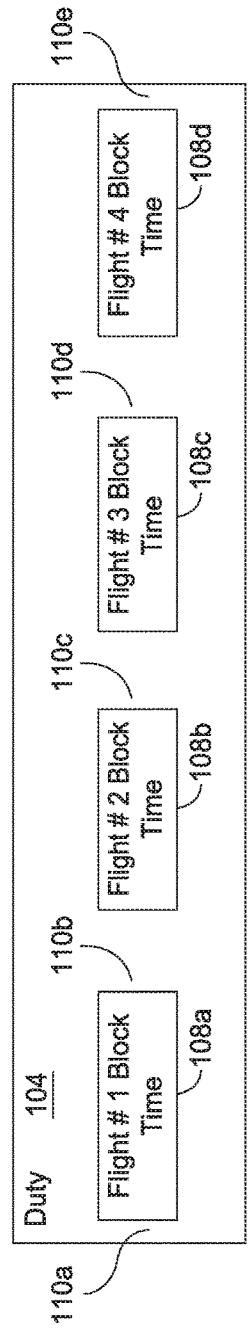
FIG. 1B is a block diagram illustrating an exemplary duty period for a pilot in which the pilot is planned to perform four flight segments during the duty period.

FIG. 1B provides a more detailed view of an exemplary duty period 104 for a pilot. In the exemplary duty period 104, the pilot has been assigned to an itinerary of four flight segments 108a, 108b, 108c, and 108d (collectively, flight segments 108). Each of the flight segments 108 defines a block time, which is an elapsed time from when an aircraft is pushed back from a gate at a departure airport to when the aircraft stops at a gate at an arrival airport. Again, government regulations, airline regulations, union rules, and the like can dictate personal limits for how much block time a pilot can accumulate during a duty period 104 and how long the pilot can be on duty.

As shown in FIG. 1B, the duty period 104 can begin at an earlier time than the first flight segment 108a. As an illustration, a pilot may begin his duty period 104 when he arrives at the airport at 6:00 AM. However, the pilot's first flight segment may not depart the gate until 6:45 AM. In such an instance, a time gap 110a of forty five minutes exists between the beginning of the pilot's duty period 104 and the beginning of the block time for the first flight segment 108a. Similarly, the pilot may need time between flight segments to travel from a first aircraft to a second aircraft, review the flight plan for the next flight segment, etc. Thus, time gaps 110b, 110c, and 110d are inserted between flight segments 108 to allow for such pilot transitions. The length of the time gaps 110b, 110c, and 110d that may be needed for pilots to transition can vary depending on the airport, time of day, time of year, etc. For example, at a large, busy airport such as O'Hare International Airport in Chicago Ill., a pilot may need an hour or more to transition from a first aircraft after flying a first flight segment to a second aircraft for a second flight segment. At a smaller, less-congested airport, a pilot may only need a half-hour to transition from a first aircraft after flying a first flight segment to a second aircraft for a second flight segment. As another example, on a weekday morning when airports are busy, a pilot may need more time to transition from a first flight segment to a second flight segment than may be needed on a weekend afternoon when the airport may be less crowded.

Figure 1C:
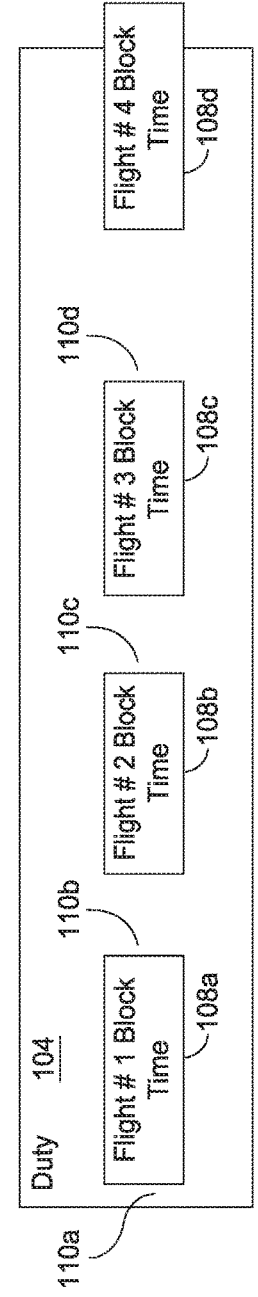
FIG. 1C is a block diagram illustrating an exemplary duty period for a pilot in which the pilot is planned to perform four flight segments, but the fourth flight segment would exceed the pilot's duty period.

Ideally, a pilot's duty period 104 includes a time gap 110e between the end of his last flight segment 108d and the end of the duty period 104. Such a time gap 110e can ensure that the pilot does not exceed his total duty time on the last flight segment. FIG. 1C illustrates an exemplary duty period 104 for a pilot in which the last flight segment 108d is delayed in departing. As a result, if the pilot performed the fourth flight segment, he would exceed his allowable duty time. For example, referring again to FIG. 1C, if the fourth flight segment 108d is delayed such that the aircraft will not arrive at the gate before the pilot's duty period 104 ends or within a predefined window of time after the pilot's duty period 104 ends, then the pilot cannot fly the flight segment 108d, and a different pilot has to perform the flight segment. By contrast, if the fourth flight segment 108d takes off on time (as shown in FIG. 1B) but is delayed in the air (e.g., by weather) such that the aircraft does not arrive at the gate until after the pilots duty period 104 ends, such an inadvertent overage of the pilot's personal limits is permissible.

An operation can have one or more personnel time limit criteria associated with it. Continuing the examples above, a flight segment may have several personnel time limit criteria, such as personnel time limit criteria related to block time, arrival time, and connection time. The personnel time limits may be different based on a priority of an operation. Continuing the examples above, a particular flight segment may have a planned block time of two hours and thirty minutes. A personnel time limit criterion related to block time can be set to two hours and thirty minutes. For high priority flight segments, the personnel time limit criterion related to block time may be increased to three hours to provide a greater likelihood that the pilots assigned to the flight segments will not have run out of time to operate the flight.

For commercial airline operations, a flight segment may be defined as an operation planned to depart a first airport at a specific time of day (and possibly a day of the week) and arrive at a second airport at a second specific time of day. For example, an airline may operate hourly flight segments between LaGuardia Airport in New York City and Reagan national Airport in Washington D.C. The flight segment leaving LaGuardia at 7 AM each day is considered a first flight segment, a flight segment leaving LaGuardia at 8 AM each day is considered a second flight segment, etc. Often, an airline will use the same numerical indicator (e.g., Oceanic 1140 or Oceanic 3288) for the same flight segment on each day. Alternatively, an airline may treat all flights between a particular city pair (e.g., any flight from Atlanta, Ga. to LaGuardia Airport in New York City, N.Y.) as the same flight segment. However, airlines sometimes treat weekend flight segments differently than weekday flight segments because airlines may fly different schedules on the weekends and/or air traffic congestion may be reduced. For example, a flight segment from LaGuardia to Reagan National may take one hour gate to gate during the week due to air traffic and the like. However, the same flight segment may only take fifty minutes on the weekend.

Another issue that arises in flight planning is mismatched rotations. A mismatched rotation occurs when an aircraft is scheduled to fly a particular segment but instead a different aircraft flies that segment. FIG. 2A illustrates a planned itinerary 200 for an aircraft, wherein the aircraft is scheduled to fly a first segment 212 from Los Angeles, Calif. 202 to Denver Colo. 204, a second segment 214 from Denver, Colo. 204 to Chicago, Ill. 206, and a third segment 216 from Chicago, Ill. 206 to Atlanta, Ga. 208. Referring now to FIG. 2B, in various circumstances, the aircraft may fly different segments than planned according to the schedule. FIG. 2B illustrates an actual itinerary 200' for the aircraft, wherein the aircraft actually flies the first segment 212 from Los Angeles, Calif. 202 to Denver, Colo. 204 and the second segment 214 from Denver, Colo. 204 to Chicago, Ill. 206. However, instead of flying the planned third segment 216 to Atlanta, Ga. 208, the aircraft instead flies a segment 218 to Newark, N.J. 210. Such mismatched rotations can be problematic for several reasons. First, in instances of mismatched rotations, the crew that flies the aircraft may not be legal to fly the actual flight segment. For example, the segment 216 from Chicago, Ill. 206 to Atlanta, Ga. 208 may be scheduled for two hours of flight time whereas the segment 218 from Chicago, Ill. 206 to Newark, N.J. 210 may be scheduled for two and a half hours of flight time. The extra half hour of flight time to actually fly to Newark, N.J. 210 could cause the flight crew to exceed a time limit, discussed above.

Second, in instances of mismatched rotations, the aircraft could be misplaced with respect to other air crews for future flights. For example, referring to FIGS. 2A and 2B, a different aircrew may be positioned in Atlanta, Ga. 208 to fly the aircraft two additional destinations. However, aircrew qualified to fly a particular aircraft may not be positioned in Newark, N.J. 210. As a result, then aircrew would have to be transported to Newark, N.J. 210 to fly the aircraft, potentially resulting in delays and/or expenses. Third, a mismatched rotation could cause a chain reaction of delays. Continuing the example above, suppose that the leg from Denver, Colo. 204 to Chicago, Ill. 206 is delayed by one hour. As a result, the crew flying the Denver, Colo. 204 to Chicago, Ill. 206 leg could still be scheduled to fly the Chicago, Ill. 206 to Atlanta, Ga. 208 route, but on a different aircraft because the aircraft from Denver, Colo. 204 to Chicago, Ill. 206 will now go to Newark, N.J. 210. As a result, the flight from Chicago, Ill. 206 to Newark, N.J. 210 would be delayed while waiting for the aircraft to arrive from Denver, Colo. 204 and the flight from Chicago, Ill. 206 to Atlanta, Ga. 208 will be delayed while waiting for the crew to arrive in Chicago, Ill. 206 from Denver, Colo. 204.

To avoid exceeding the personal limits of pilots, airlines can employ buffers to account for operating variances. For example, airlines may add an hour of extra block time to a duty period when scheduling the crew to decrease the likelihood that the crew will actually exceed their personal limits. Similarly, an airline may require a minimum connection time (by adding a connection time buffer between flight segments) of an hour and a half regardless of the airport, the time of day, the time of year, or the like. These buffers are often set to a conservative number that will capture most flight operations. However, a significant number of flight operations do not require such large buffers. As a result, significant amounts of crew time can be wasted by these buffers. For example, if the pilot is only allowed eight hours of block time during any given duty period 104, then an hour of block time buffer only allows the pilot to be planned to fly seven actual block hours. Although such buffers can be wasteful, airlines have not been able to analyze actual flight operations data in a manner that would allow them to fine-tune the buffers they set for various flight operations.

In various aspects described herein, systems and methods operate on large quantities of data related to planned vehicle operations (e.g., flight operations of commercial aircraft) and actual vehicle operations to output the variance reports that illustrate differences and trends in variances between planned and actual vehicle operations. The variance reports are dynamic such that a user can change certain criteria (e.g., a threshold limit for a variance) and the variance report will quickly update based on the changed criteria. Using these dynamic variance reports, schedule planners for vehicle operations and/or vehicle operators can study and understand different variances that occur for various flight segments based on time of day, day of the week, severity of the variance, and the like. The schedule planners can use this deeper understanding of the variances to provide more accurate buffers to use in future planning for vehicle operations and/or vehicle operators.

Figure 3:
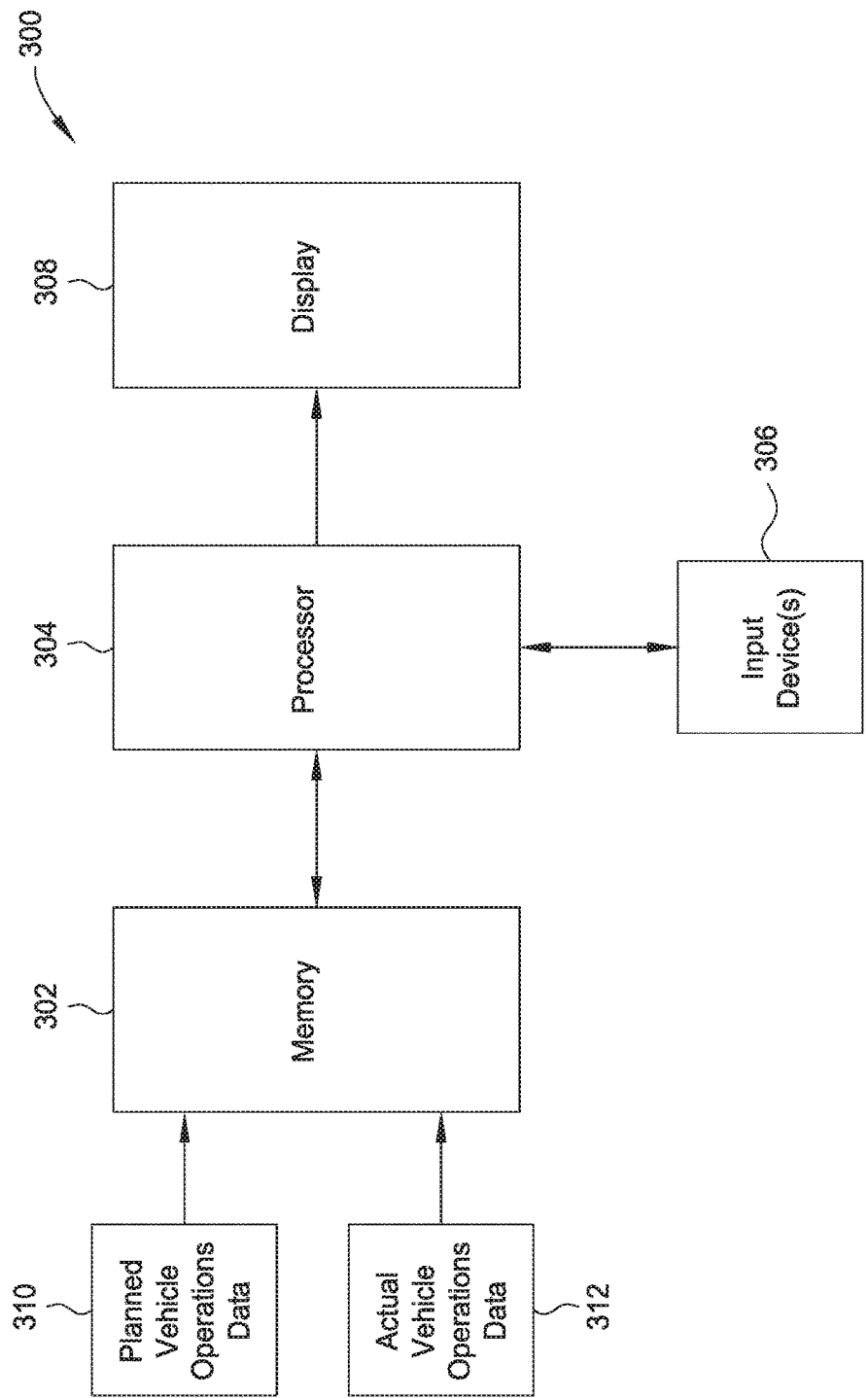
FIG. 3 is a block diagram of a system according to at least one aspect.

FIG. 3 illustrates a computer system 300 that can be used to output the various reports that illustrate differences and trends in variances between planned and actual vehicle operations. The computer system 300 includes computer memory 302. The computer memory 302 can include one or more data structures that store electronic data, including planned vehicle operations data 310 and actual vehicle operations data 312. The computer system 300 also includes a processor 304 that can operate on the stored planned vehicle operations data 310 and actual vehicle operations data 312. The processor 304 can transform the stored planned vehicle operations data 310 and the actual vehicle operations data 312 from a first format to a second format. For example, the planned vehicle operations data 310 and the actual vehicle operations data 312 may be stored in the computer memory 302 in a spreadsheet file, such as a Microsoft® Excel® spreadsheet file. The processor 304 could convert the data to a different format, such as a data format compatible with a vehicle operating crew planning program. The crew planning software can be used to assign vehicles to particular routes and to assign different vehicle operators or vehicle operating crews to the routes. An example of such crew planning software is the Jeppesen Crew Pairing software. The Jeppesen Crew Pairing software is used to assign different pilot crews to different routes and Jeppesen Fleet Tracking assigns aircraft to the different routes. The computer processor 304 can operate on the formatted data to generate and output the variance reports. In various aspects, the processor could generate and output the variance reports based on the original format of the data (e.g., a spreadsheet file format). The computer system 300 can include a display device 308 that is in communication with the processor 304. The display device 308 can provide images of the variance reports generated output by the processor 304. In various aspects, the display device 308 could be a computer display screen, such as a LCD display. In various other aspects, the display device 308 could include a printer, or the like, that prints paper copies of the variance reports. The computer system 300 also includes input device(s) 306 in communication with the computer processor 304 to enter and/or change user-adjustable criteria for dynamic variance reports. The input device(s) 306 could include a keyboard, a computer mouse, a trackpad, an electronic stylus, and/or the like.

Figure 4A:
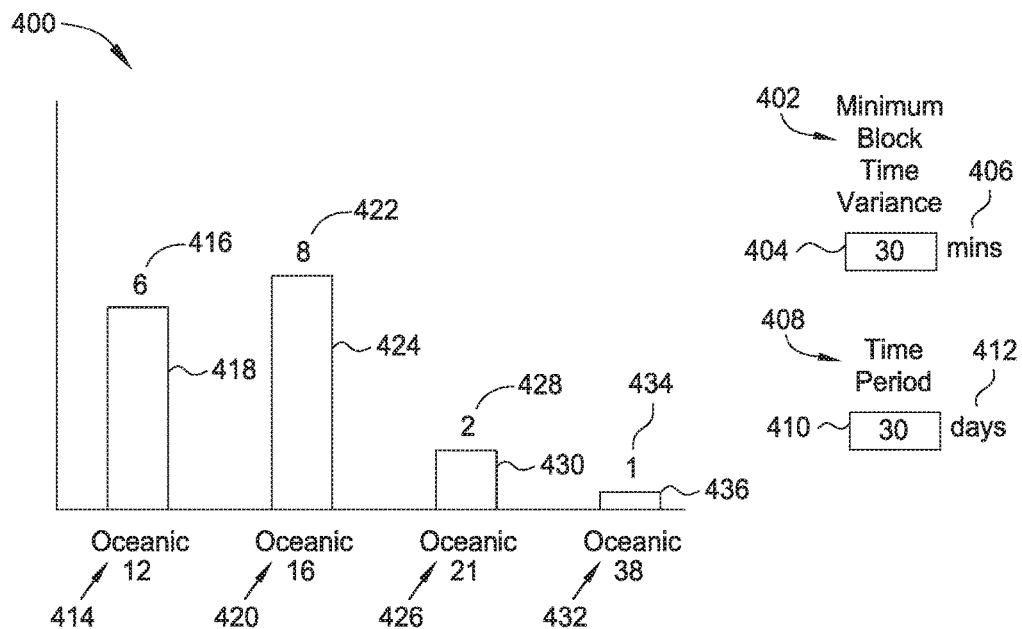
FIG. 4A is an exemplary dynamic variance report according to at least one aspect that shows vehicle operations that included block time variances of thirty minutes or more.

FIG. 4A depicts a display screen view of a dynamic variance report 400 according to various aspects for block time variances for various commercial aircraft flight segments. The dynamic variance report 400 includes two user-adjustable criteria. The first user-adjustable criterion is a minimum block time variance 402 expressed in units of minutes 406. The display includes an input field 404 in which a user, using the input device(s) 306, can enter a minimum block time variance. For example, FIG. 4A illustrates the user-adjustable criterion for minimum block time variance 402 being set to thirty minutes, meaning that only flight segments having block time variances of thirty minutes or more are displayed. The second user-adjustable criterion is a time period 408 for the dynamic variance report 400 expressed in units of days 412. The display includes an input field 410 in which a user, using the input device(s) 306, can enter a time period for the dynamic variance report 400. For example, FIG. 4A illustrates the user-adjustable criterion for time period 408 being set to thirty days. Based on the user-adjustable criteria for minimum block time variance 402 and time period 408, the dynamic variance report 400 displays block time variance information for four flight segments for Oceanic Airlines that had vehicle operations in the past thirty days with block time variances of thirty minutes or more. Oceanic 12 (reference 414) had a total of six vehicle operations in the last thirty days (i.e., flight segments) that had a block time variance that exceeded thirty minutes. Here, the six vehicle operations are represented both by a numeral display 416 and by a bar graph 418. Also, Oceanic 16 (reference 420) had a total of eight vehicle operations in the last thirty days that had a block time variance of thirty minutes or more (represented by the numeral display 422 and by the bar graph display 424). Also, Oceanic 21 (reference number 426) had a total of two vehicle operations in the last thirty days that had a block time variance of thirty minutes or more (represented by the numeral display 428 and by the bar graph display 430). Finally, Oceanic 38 (reference 432) had a total of one vehicle operation in the last thirty days that had a block time variance of thirty minutes or more (represented by the numeral display 434 and by the bar graph display 436).

Figure 4B:
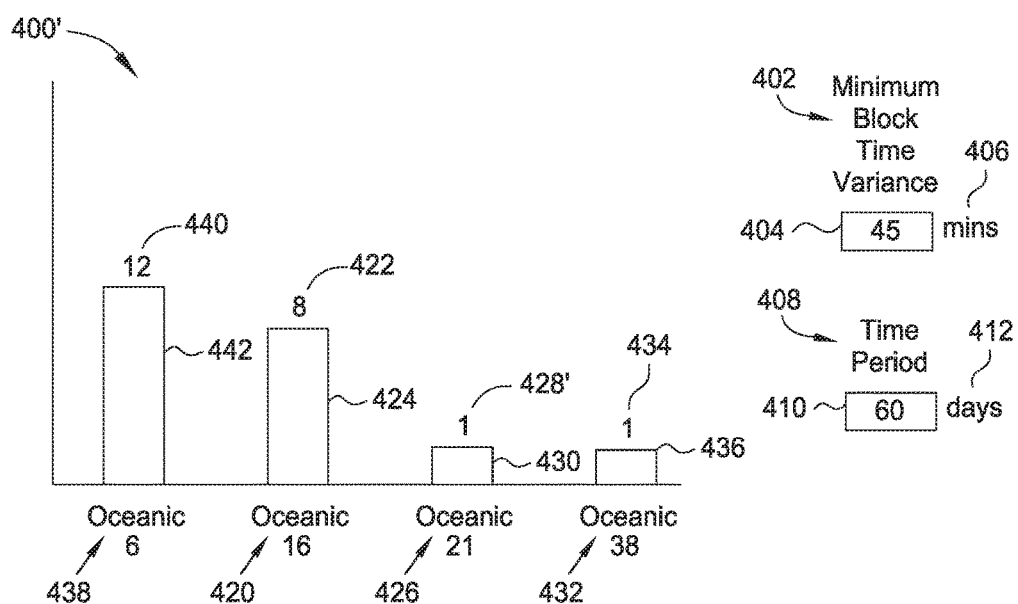
FIG. 4B is the exemplary dynamic variance report of FIG. 4A in which the variance report has been dynamically changed to show vehicle operations that included block time variances of forty five minutes or more.

FIG. 4B illustrates an updated display of the dynamic variance report 400' after the user-adjustable criteria have been changed. For example, the input field 404 for the minimum block time variance 402 has been changed to forty five minutes and the input field 410 for the time period 408 has been changed to sixty days. In the updated display of the dynamic variance report 400', Oceanic 12 (reference 414 in FIG. 4A) no longer appears, meaning that none of the block time variances for Oceanic 12 in the last sixty days were at least forty five minutes. However, Oceanic 6 (reference 438) has been added to the dynamic variance report 400' and had a total of twelve block time variances (represented by the numeral display 440 and by the bar graph display 442), meaning that Oceanic 6 had block time variances for forty five minutes or more between thirty one and sixty days ago but no block time variances of thirty minutes or more in the last thirty days. Such a dynamic presentation of data could cause a schedule planner to investigate operations related to Oceanic 6 in greater detail to identify the cause of the block time variances for Oceanic 6 and to determine whether a buffer for block time variances for future Oceanic 6 vehicle operations should be adjusted. The remaining three vehicle operations from FIG. 4A (Oceanic 16, Oceanic 21, and Oceanic 38) shown in the updated display of the dynamic variance report 400' are the same. However, in some instances, the numbers of instances of block time variances have changed. For example, Oceanic 21 (reference number 426) only has one block time variance of 45 minutes or more, as indicated by the numeral 428' and the bar graph 430'.

Figure 5A:
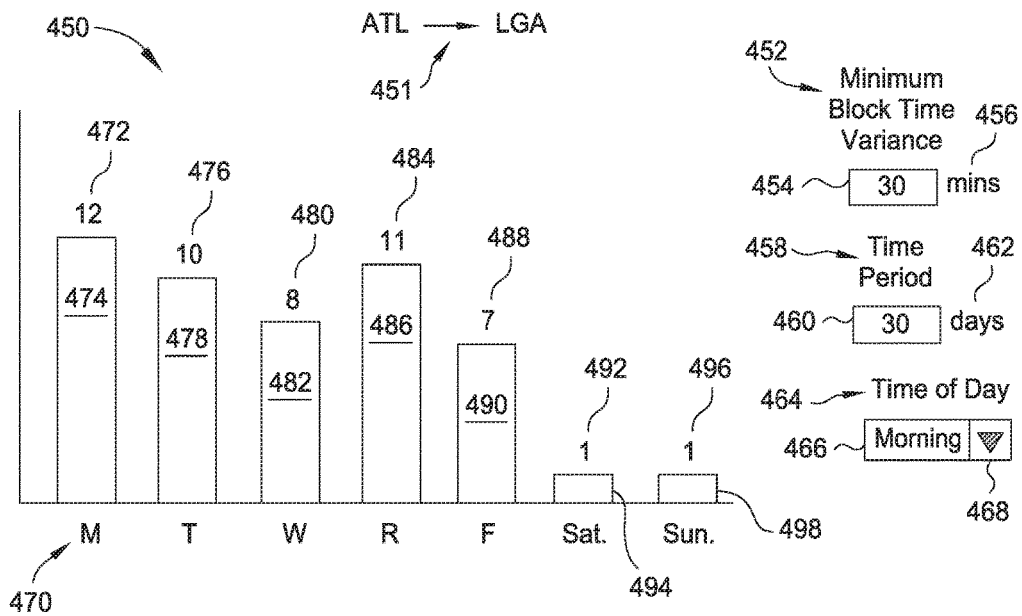
FIG. 5A is an exemplary dynamic variance report according to at least one aspect that shows morning vehicle operations from Hartsfield International Airport in Atlanta, Ga. (ATL) to LaGuardia Airport in New York City, N.Y. (LGA) that include block time variances of thirty minutes or more in the last thirty days.

FIG. 5A illustrates a display for a dynamic variance report 450 for vehicle operations along a particular route (i.e., a particular flight segment). In this case, the route is from Hartfield International Airport in Atlanta, Ga. (ATL) to LaGuardia Airport in New York City, N.Y. (LGA). The dynamic variance report 450 displays the vehicle operations based on the day of the week 470. The dynamic variance report 450 includes three user-adjustable criteria. The first user-adjustable criterion is a minimum block time variance 452 expressed in units of minutes 456. The display includes an input field 454 in which a user, using the input device(s) 306, can enter a minimum block time variance to be displayed. For example, FIG. 5A illustrates the user-adjustable criterion for minimum block time variance 452 being set to thirty minutes, meaning that only flight segments having block time variances of thirty minutes or more are displayed. The second user-adjustable criterion is a time period 408 for the dynamic variance report 400 expressed in units of days 412. The display includes an input field 410 in which a user, using the input device(s) 306, can enter a time period for the dynamic variance report 400. The third user-adjustable criterion is a time of day 464. The display includes a field 466 that displays the selected time of day (morning in FIG. 5A) and a drop-down icon 468 the user could select the drop-down icon 468 using a computer mouse or the like to change the selected time of day to mid day, afternoon, early evening, late evening, overnight, or the like. Other user-adjustable criteria could include selecting a month, a year, and/or a season. Based on the user-adjustable criteria, the dynamic variance report 450 shows that there were twelve operations on Mondays in the last thirty days that had block time variances of thirty minutes or greater (indicated by the numeral 472 and the bar graph 474). Additionally, the dynamic variance report 450 shows that there were ten operations on Tuesday in the last thirty days that had block time variances of thirty minutes or greater (indicated by the numeral 476 and the bar graph 478). Also, the dynamic variance report 450 shows that there were eight operations on Wednesdays in the last thirty days that had block time variances of thirty minutes or greater (indicated by the numeral 480 and the bar graph 482). Also, the dynamic variance report 450 shows that there were eleven operations on Thursdays in the last thirty days that had block time variances of thirty minutes or greater (indicated by the numeral 484 and the bar graph 486). Also, the dynamic variance report 450 shows that there were seven operations on Fridays in the last thirty days that had block time variances of thirty minutes or greater (indicated by the numeral 488 and the bar graph 490). Also, the dynamic variance report 450 shows that there was one operation on Saturdays in the last thirty days that had block time variances of thirty minutes or greater (indicated by the numeral 492 and the bar graph 494). Also, the dynamic variance report 450 shows that there was one operation on Sundays in the last thirty days that had block time variances of thirty minutes or greater (indicated by the numeral 496 and the bar graph 498).

From the dynamic variance report 450, it is clear that in this instance, the block time variances are smaller on the weekends than during the weekdays. As a result, a scheduler could define a buffer for block times for the weekend days that is different from a buffer for block times on weekdays.

Figure 5B:
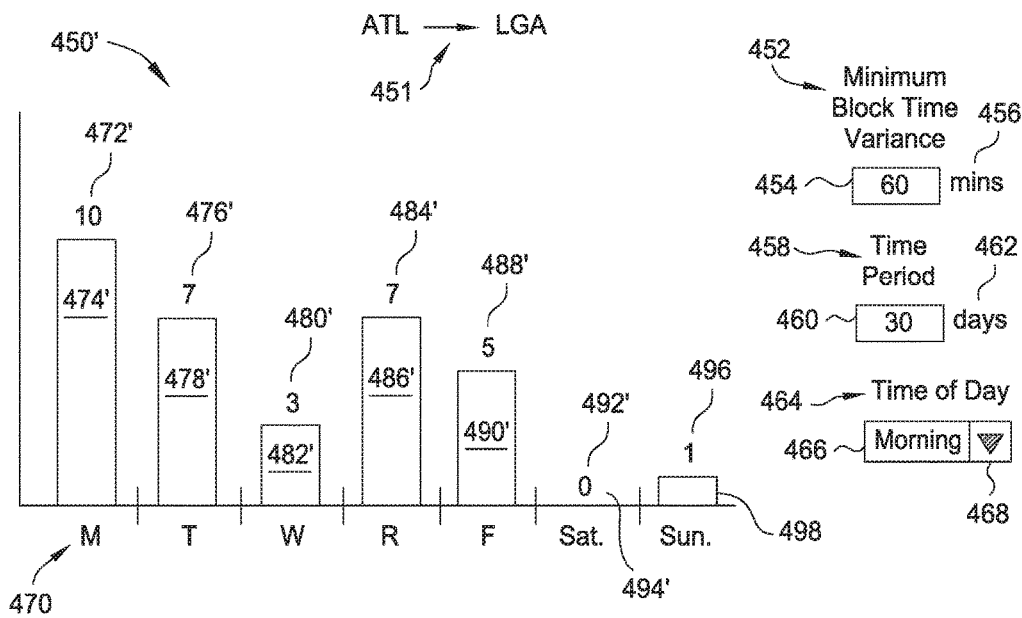
FIG. 5B is the exemplary dynamic variance report of FIG. 5A in which the display has been dynamically changed to show morning vehicle operations from ATL to LGA with block time variances of sixty minutes or more.

FIG. 5B illustrates an updated display of the block time variance report 450' in which the user-adjustable minimum block time variance criterion has been changed to sixty minutes (indicated in the input field 454). In general, the numbers of vehicle operations with block time variances that are sixty minutes or more are less than the number of vehicle of block time variances that are thirty minutes or more. For example, the dynamic variance report 450' shows that there were ten operations on Mondays in the last thirty days that had block time variances of thirty minutes or greater (indicated by the numeral 472' and the bar graph 474'). Additionally, the dynamic variance report 450' shows that there were seven operations on Tuesday in the last thirty days that had block time variances of thirty minutes or greater (indicated by the numeral 476' and the bar graph 478'). Also, the dynamic variance report 450' shows that there were three operations on Wednesdays in the last thirty days that had block time variances of thirty minutes or greater (indicated by the numeral 480' and the bar graph 482'). Also, the dynamic variance report 450' shows that there were seven operations on Thursdays in the last thirty days that had block time variances of thirty minutes or greater (indicated by the numeral 484' and the bar graph 486'). Also, the dynamic variance report 450' shows that there were five operations on Fridays in the last thirty days that had block time variances of thirty minutes or greater (indicated by the numeral 488' and the bar graph 490'). Also, the dynamic variance report 450' shows that there were no operations on Saturdays in the last thirty days that had block time variances of thirty minutes or greater (indicated by the numeral 492' and absent bar graph 494'). Also, the dynamic variance report 450' shows that there was one operation on Sundays in the last thirty days that had block time variances of thirty minutes or greater (indicated by the numeral 496 and the bar graph 498). By comparing the dynamic variance report 450 in FIG. 5A with the updated dynamic variance report 450' shown in FIG. 5B, a scheduler could see that many of the variances that exceeded thirty minutes also exceeded sixty minutes. Thus, a buffer of thirty minutes may not be sufficient to reduce variances. Similarly, a buffer of sixty minutes may not be sufficient to reduce variances. In various aspects and/or circumstances, a scheduler could continue to adjust the user-adjustable criteria for minimum block time variance 452 until the number of operations that exceed the variance is suitably low. The resulting value for the user-adjustable criteria for minimum block time variance 452 could then be used by the scheduler to assign a block time buffer for operations from ATL to LGA.

Figure 5C:
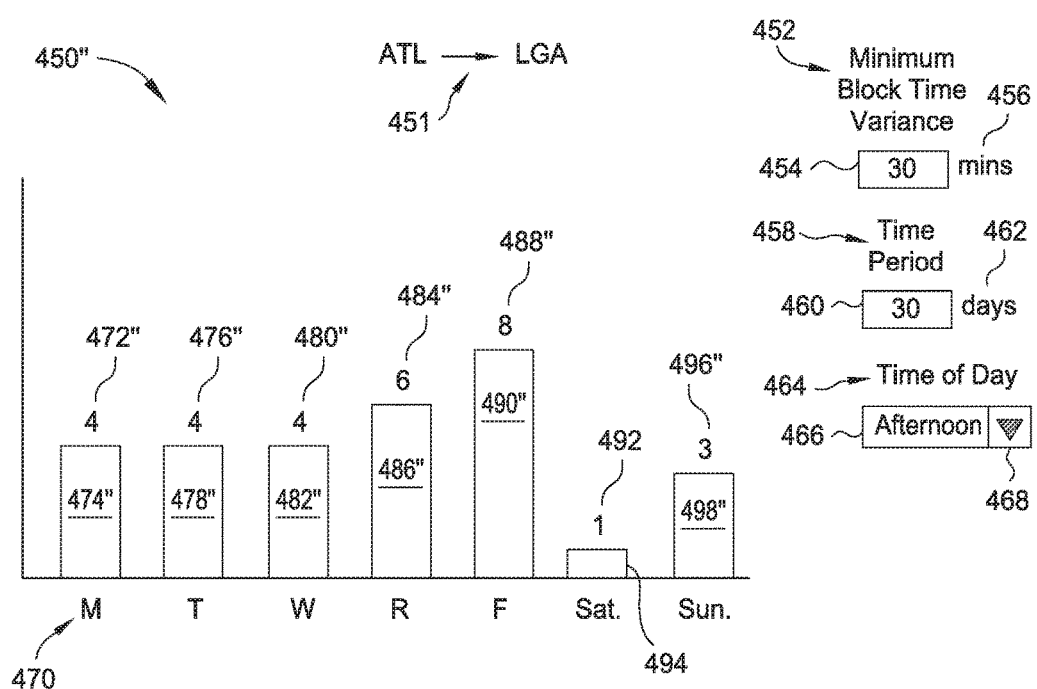
FIG. 5C is the exemplary dynamic variance report of FIG. 5A in which the display has been dynamically changed to show afternoon vehicle operations from ATL to LGA with block time variances of thirty minutes or more.

FIG. 5C is another updated display of the dynamic variance report 450" in which the user-adjustable criterion for the minimum block time variance 452 is set to thirty minutes (as indicated by the input field 454), but the time of day criterion 464 has been changed to afternoon (as indicated by the input field 466). In general, the numbers of vehicle operations with block time variances that are thirty minutes or more in the afternoon are less than the number of vehicle of block time variances that are thirty minutes or more in the morning. For example, the dynamic variance report 450" shows that there were four vehicle operations on Mondays in the last thirty days that had block time variances of thirty minutes or greater (indicated by the numeral 472" and the bar graph 474"). Additionally, the dynamic variance report 450" shows that there were four vehicle operations on Tuesday in the last thirty days that had block time variances of thirty minutes or greater (indicated by the numeral 476" and the bar graph 478"). Also, the dynamic variance report 450" shows that there were four vehicle operations on Wednesdays in the last thirty days that had block time variances of thirty minutes or greater (indicated by the numeral 480" and the bar graph 482"). Also, the dynamic variance report 450" shows that there were six vehicle operations on Thursdays in the last thirty days that had block time variances of thirty minutes or greater (indicated by the numeral 484" and the bar graph 486"). Also, the dynamic variance report 450" shows that there were eight vehicle operations on Fridays in the last thirty days that had block time variances of thirty minutes or greater (indicated by the numeral 488" and the bar graph 490"). Also, the dynamic variance report 450" shows that there was one operation on Saturdays in the last thirty days that had block time variances of thirty minutes or greater (indicated by the numeral 492" and the bar graph 494"). Also, the dynamic variance report 450" shows that there were three operations on Sundays in the last thirty days that had block time variances of thirty minutes or greater (indicated by the numeral 496" and the bar graph 498"). By comparing the dynamic variance report 450 in FIG. 5A with the updated dynamic variance report 450" shown in FIG. 5C, a scheduler could see that fewer operations in the afternoon had block time variances of thirty minutes or more than operations in the morning. Thus, a smaller buffer could be used for afternoon operations than morning operations. In various aspects and/or circumstances, a scheduler could continue to adjust the user-adjustable criteria for minimum block time variance 452 until the number of operations that exceed the variance in the morning and in the afternoon is acceptably low. The resulting values for the user-adjustable criteria for minimum block time variance 452 for the morning and the afternoon could then be used by the scheduler to assign block time buffers for operations from ATL to LGA for morning and afternoon operations, respectively.

The dynamic variance reports 450, 450', and 450" shown in FIGS. 5A-5C also show that the number of operations with block time variances of thirty minutes or more goes down as the week progresses for morning operations from ATL to LGA. By contrast, the dynamic variance reports 450, 450', and 450" show that the number of operations with block time variance of thirty minutes or more goes up as the week progresses for afternoon operations from ATL to LGA. Such trends identified from the dynamic variance reports 450, 450', and 450" could provide motivation for a scheduler or other person to identify reasons for such trends. For example, morning flights to LGA could experience delays early in the week due to businessman traveling to New York City for business. By contrast, afternoon flights to LGA could experience delays later in the week due to individuals traveling to New York City for a weekend vacation. Again, a scheduler could use the information from the dynamic variance reports 450, 450', and 450", and any underlying reasons discovered by studying the data) to adjust buffers for block time variance for operations from ATL to LGA.

Figure 6A:
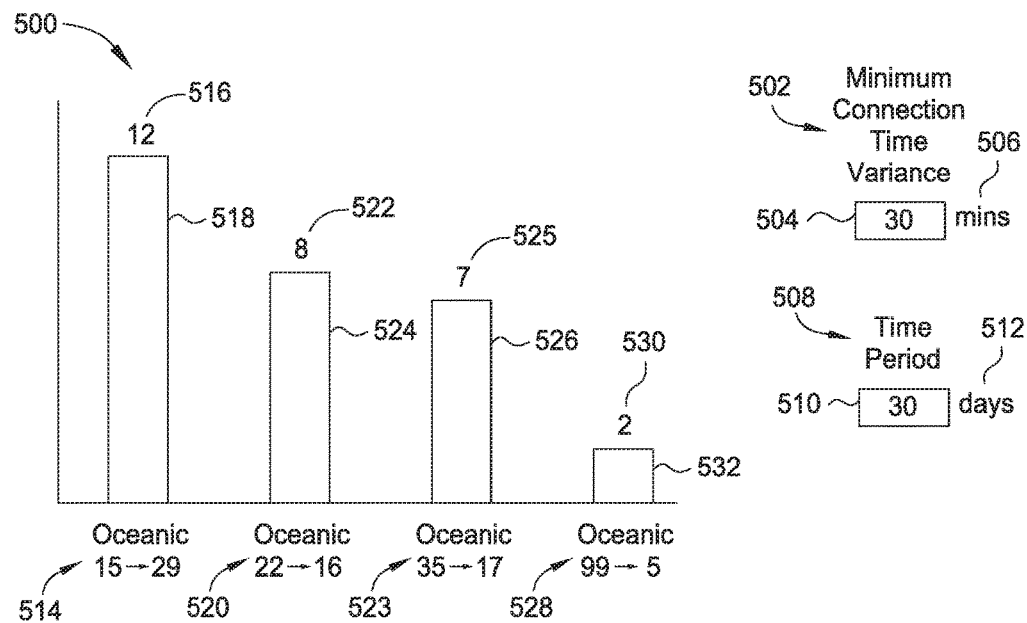
FIG. 6A is an exemplary dynamic variance report according to at least one aspect that shows vehicle operation pairs that included connection time variances of thirty minutes or more over the last thirty days.

FIG. 6A illustrates a display of a dynamic variance report 500 for different vehicle operation pairs, wherein the variance is a connection time variance. A connection time variance is a difference between a scheduled time for a vehicle operating crew (e.g., a flight crew) to transfer from one vehicle to another (e.g. from one aircraft to another at an airport). The dynamic variance report 500 includes two user-adjustable criteria. The first user-adjustable criterion is a minimum connection time variance 502 expressed in units of minutes 506. The display includes an input field 504 in which a user, using the input device(s) 306, can enter a minimum connection time variance to be displayed. For example, FIG. 6A illustrates the user-adjustable criterion for minimum connection time variance 502 being set to thirty minutes, meaning that only flight segment pairs having connection time variances of thirty minutes or more are displayed. The second user-adjustable criterion is a time period 508 for the dynamic variance report 500 expressed in units of days 512. The display includes an input field 510 in which a user, using the input device(s) 306, can enter a time period for the dynamic variance report 500. For example, FIG. 6A illustrates the user-adjustable criterion for the time period 508 being set to thirty days. Based on the user-adjustable criteria for minimum connection time variance 502 and time period 508, the dynamic variance report 500 displays connection time variance information for four flight segment pairs for Oceanic Airlines. Vehicle operators connecting from Oceanic 15 to Oceanic 29 (reference 514) had a total of 12 connection operations in the last thirty days that had a connection time variance that exceeded thirty minutes (represented by the numeral display 516 and by the bar graph display 518). Also, vehicle operators connecting from Oceanic 22 to Oceanic 16 (reference 520) had a total of eight connection operations in the last thirty days that have connection time variances exceeded thirty minutes (represented by the numeral display 522 and by the bar graph display 524). Also, vehicle operators connecting from Oceanic 35 and Oceanic 17 (reference 523) had a total of seven vehicle operations in the last thirty days that have connection time variances exceeded thirty minutes (represented by the numeral display 525 and by the bar graph display 526). Finally, vehicle operators connecting from Oceanic 99 to Oceanic 5 (reference 528) had a total of two vehicle operations in the last thirty days that had a connection time variance that exceeded thirty minutes (represented by the numeral display 530 and by the bar graph display 532).

Figure 6B:
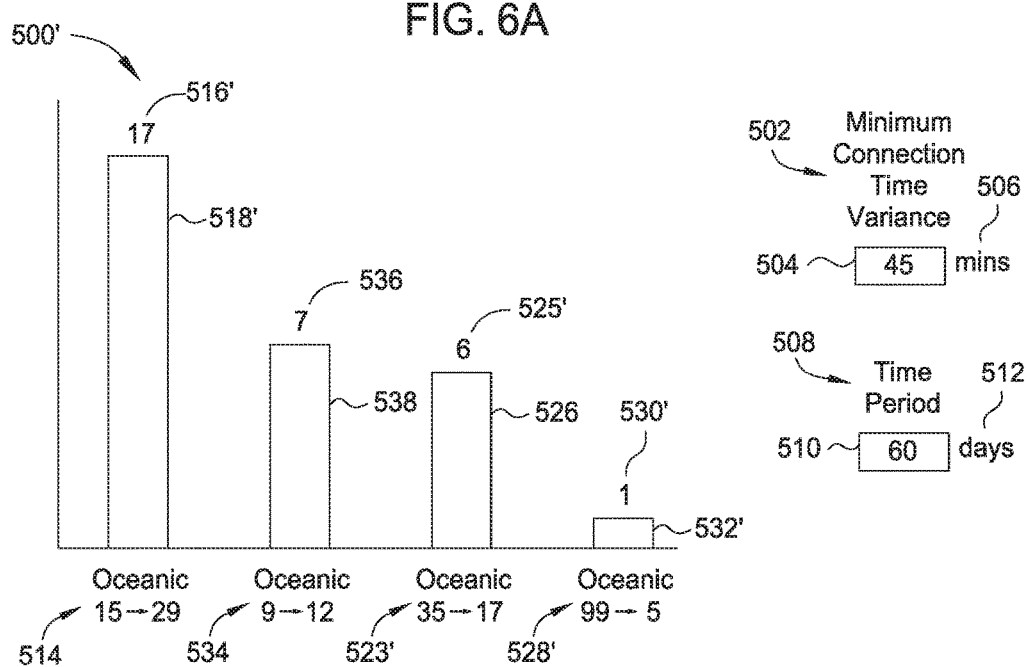
FIG. 6B is the exemplary dynamic variance report of FIG. 6A in which the variance report has been dynamically changed to show vehicle operation pairs that included connection time variances of forty five minutes or more over the last sixty days.

FIG. 6B illustrates an updated display of the dynamic variance report 500' after the user-adjustable criteria have been changed. For example, the input field 504 for the minimum connection time variance 502 has been changed to forty five minutes and the input field 510 for the time period 508 has been changed to sixty days. In the updated display of the dynamic variance report 500', the connection from Oceanic 22 to Oceanic 16 (reference 520 in FIG. 6A) no longer appears, meaning that none of the connection time variances in the last sixty days were at least forty five minutes. However, a connection from Oceanic 9 to Oceanic 12 (reference 534) does appear and had a total of seven connection time variances (represented by the numeral display 536 and by the bar graph display 538), meaning that the vehicle operators connecting from Oceanic 9 to Oceanic 12 had connection time variances of at least forty five minutes between thirty one and sixty days ago but no connection time variances of thirty minutes or more in the last thirty days. Such a dynamic presentation of data could cause a schedule planner to investigate operations related to Oceanic 9 and Oceanic 12 in greater detail to identify the cause of the connection time variances for these vehicle operations and to determine whether a buffer for connection time variances for the flights should be adjusted. The remaining three connections from FIG. 6A (Oceanic 15 to Oceanic 29, Oceanic 35 to Oceanic 17, and Oceanic 99 to Oceanic 5 ) shown in the updated display of the dynamic variance report 500' are the same. However, in some instances, the numbers of instances of block time variances have changed. For example, the number of instances of connection variances from Oceanic 15 to Oceanic 29 increased to 17 instances of connection time variances of forty five minutes over sixty days, as indicated by the numeral 516' and the bar graph 518.

Figure 7A:
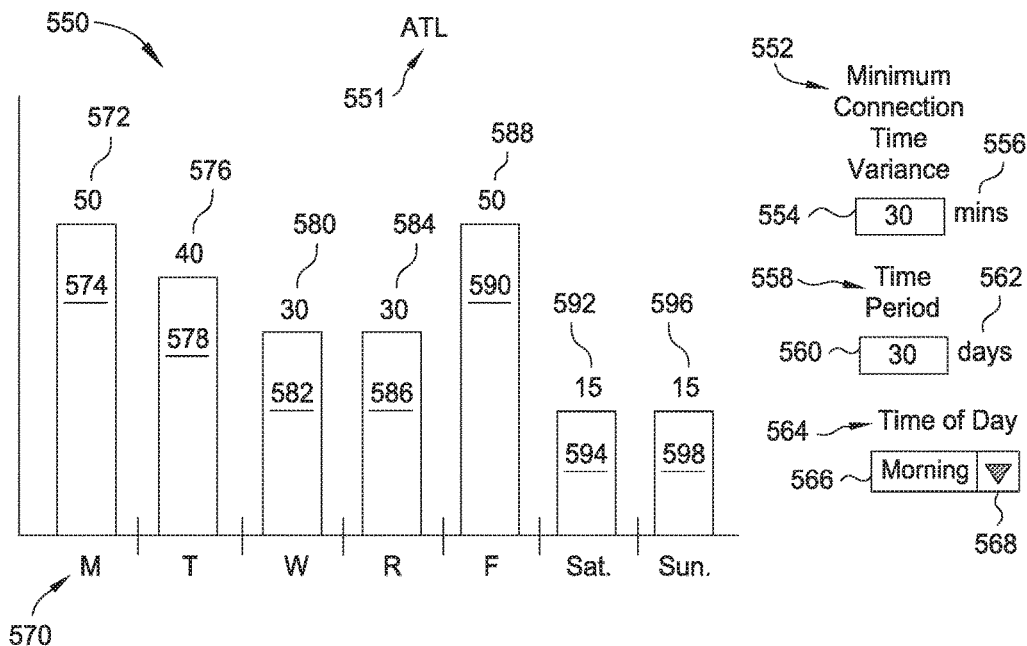
FIG. 7A is an exemplary dynamic variance report according to at least one aspect that shows morning vehicle operation pairs at ATL that include connection time variances of thirty minutes or more in the last thirty days.

FIG. 7A illustrates a display for a dynamic variance report 550 for connection time variances at a particular airport. In this case, the airport is Hartfield International Airport in Atlanta Ga. (ATL) 551. The dynamic variance report 550 displays the vehicle operations based on day of the week 570. The dynamic variance report 550 includes three user-adjustable criteria. The first user-adjustable criterion is a minimum connection time variance 552 expressed in units of minutes 556. The display includes an input field 554 in which a user, using the input device(s) 306, can enter a minimum connection time variance to be displayed. For example, FIG. 7A illustrates the user-adjustable criterion for minimum connection time variance 552 being set to thirty minutes, meaning that only flight segments having connection time variances of thirty minutes or more are displayed. The second user-adjustable criterion is a time period 558 for the dynamic variance report 550 expressed in units of days 562. The display includes an input field 560 in which a user, using the input device(s) 306, can enter a time period for the dynamic variance report 550. The third user-adjustable criterion is a time of day 564. The display includes a field 566 that displays the selected time of day (morning in FIG. 7A) and a drop-down icon 568. The user could select the drop-down icon 568 using a computer mouse or the like to change the selected time of day to mid day, afternoon, early evening, late evening, overnight, or the like. Based on the user-adjustable criteria, the dynamic variance report 550 shows that there were fifty operations on Mondays in the last thirty days and in the mornings that had connection time variances of thirty minutes or greater (indicated by the numeral 572 and the bar graph 574). Additionally, the dynamic variance report 550 shows that there were forty operations on Tuesdays in the last thirty days and in the mornings that had connection time variances of thirty minutes or greater (indicated by the numeral 576 and the bar graph 578). Also, the dynamic variance report 550 shows that there were thirty operations on Wednesdays in the last thirty days and in the mornings that had connection time variances of thirty minutes or greater (indicated by the numeral 580 and the bar graph 582). Also, the dynamic variance report 550 shows that there were thirty operations on Thursdays in the last thirty days and in the mornings that had connection time variances of thirty minutes or greater (indicated by the numeral 584 and the bar graph 586). Also, the dynamic variance report 550 shows that there were fifty operations on Fridays in the last thirty days and in the mornings that had connection time variances of thirty minutes or greater (indicated by the numeral 588 and the bar graph 590). Also, the dynamic variance report 550 shows that there were fifteen operations on Saturdays in the last thirty days and in the mornings that had connection time variances of thirty minutes or greater (indicated by the numeral 592 and the bar graph 594). Also, the dynamic variance report 550 shows that there were fifteen operations on Sundays in the last thirty days and in the mornings that had connection time variances of thirty minutes or greater (indicated by the numeral 596 and the bar graph 598).

Figure 7B:
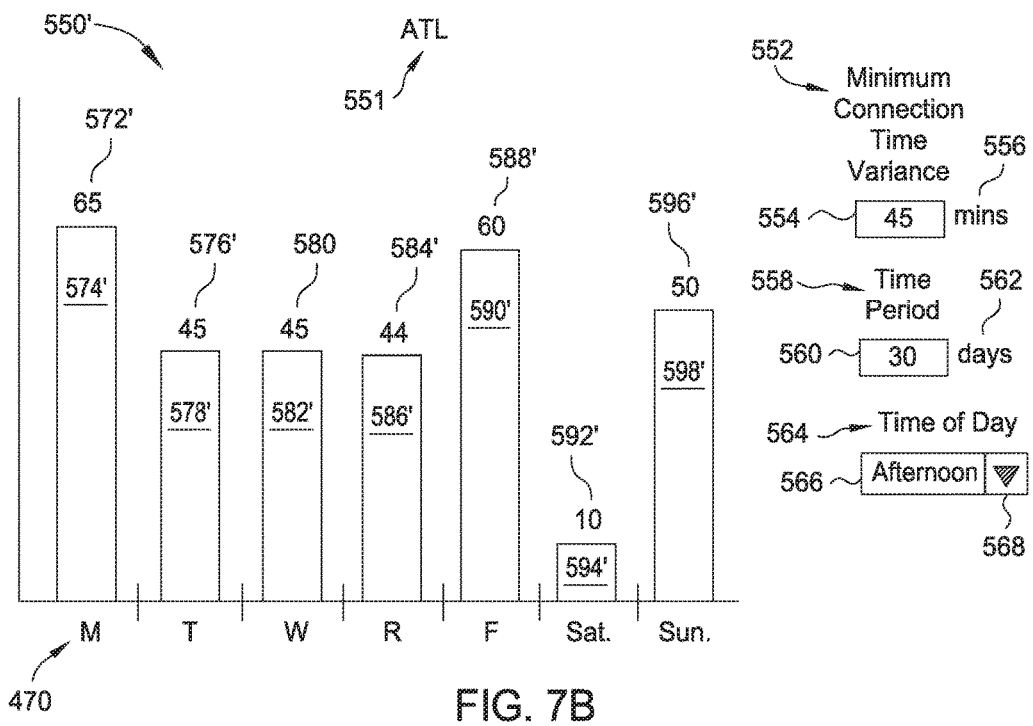
FIG. 7B is the exemplary dynamic variance report of FIG. 7A in which the display has been dynamically changed to show afternoon vehicle operation pairs at ATL with connection time variances of forty five minutes or more in the last thirty days.

FIG. 7B illustrates an updated display of the block time variance report 550' in which the user-adjustable minimum connection time variance criterion has been changed to forty five minutes (indicated in the input field 554) and the time of day criterion has been changed to afternoon (indicated in the input field 566). Based on the user-adjustable criteria, the dynamic variance report 550' shows that there were sixty five operations on Mondays in the last thirty days and in the afternoons that had connection time variances of thirty minutes or greater (indicated by the numeral 572' and the bar graph 574'). Additionally, the dynamic variance report 550' shows that there were forty five operations on Tuesdays in the last thirty days and in the afternoons that had connection time variances of thirty minutes or greater (indicated by the numeral 576' and the bar graph 578'). Also, the dynamic variance report 550' shows that there were forty five operations on Wednesdays in the last thirty days and in the afternoons that had connection time variances of thirty minutes or greater (indicated by the numeral 580' and the bar graph 582'). Also, the dynamic variance report 550' shows that there were forty four operations on Thursdays in the last thirty days and in the afternoons that had connection time variances of thirty minutes or greater (indicated by the numeral 584' and the bar graph 586'). Also, the dynamic variance report 550' shows that there were sixty operations on Fridays in the last thirty days and in the afternoons that had connection time variances of thirty minutes or greater (indicated by the numeral 588' and the bar graph 590'). Also, the dynamic variance report 550' shows that there were ten operations on Saturdays in the last thirty days and in the afternoons that had connection time variances of thirty minutes or greater (indicated by the numeral 592' and the bar graph 594'). Also, the dynamic variance report 550' shows that there were fifty operations on Sundays in the last thirty days and in the afternoons that had connection time variances of thirty minutes or greater (indicated by the numeral 596' and the bar graph 598').

Based on a comparison between the dynamic variance reports in FIGS. 7A and 7B, a scheduler could determine that the connection time variances are worse in the afternoon in general than in the morning. As a result, the scheduler could use different connection time buffers for the morning and the afternoon.

Figure 8A:
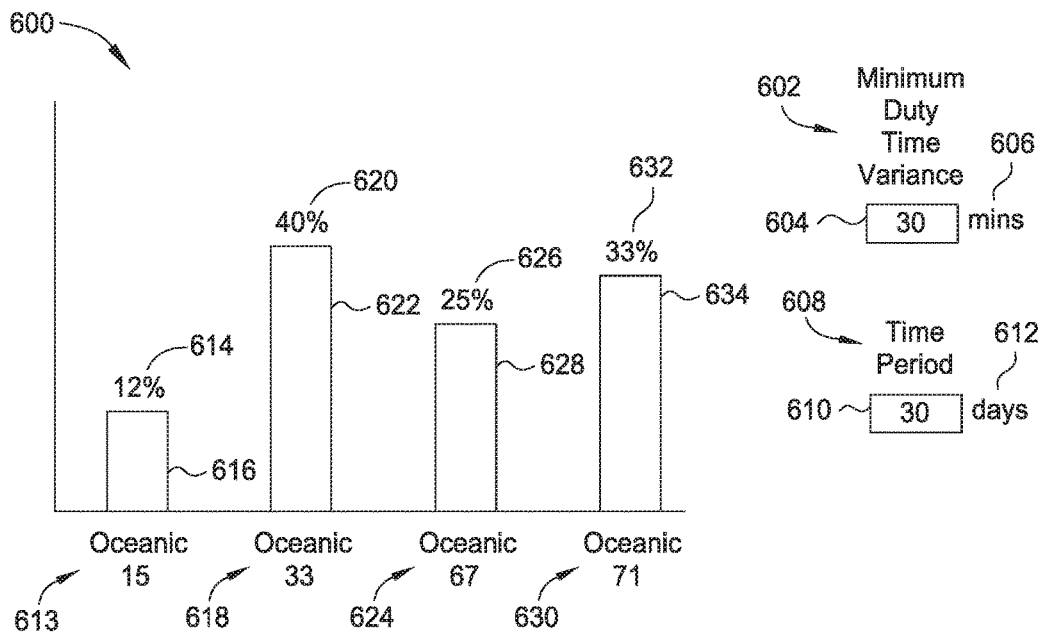
FIG. 8A is an exemplary dynamic variance report according to at least one aspect that shows vehicle operations that included duty time variances of thirty minutes or more over the last thirty days.

FIG. 8A depicts a display screen view of a dynamic variance report 600 according to various aspects for duty time variances for various commercial aircraft flight segments. The dynamic variance report 600 includes two user-adjustable criteria. The first user-adjustable criterion is a minimum duty time variance 602 expressed in units of minutes 606. The display includes an input field 604 in which a user, using the input device(s) 306, can enter a minimum duty time variance to be displayed. For example, FIG. 8A illustrates the user-adjustable criterion for minimum duty time variance 602 being set to thirty minutes, meaning that only flight segments having duty time variances of thirty minutes or more are displayed. The second user-adjustable criterion is a time period 608 for the dynamic variance report 600 expressed in units of days 612. The display includes an input field 610 in which a user, using the input device(s) 306, can enter a time period for the dynamic variance report 400. For example, FIG. 8A illustrates the user-adjustable criterion for time period 608 being set to thirty days. Based on the user-adjustable criteria for minimum duty time variance 602 and time period 608, the dynamic variance report 600 displays duty time variance information for four flight segments for Oceanic Airlines. Twelve percent of the vehicle operations for Oceanic 15 (reference 613) in the last thirty days (i.e., flight segments) had a duty time variance that exceeded thirty minutes. Here, the twelve percent of vehicle operations is represented both by a numeral display 614 and by a bar graph 616. Also, forty percent of the vehicle operations for Oceanic 33 (reference number 618) in the last thirty days had a duty time variances exceeded thirty minutes (represented by the numeral display 620 and by the bar graph display 622). Also, twenty five percent of the vehicle operations for Oceanic 67 (reference number 624) in the last thirty days had a duty time variances exceeded thirty minutes (represented by the numeral display 626 and by the bar graph display 628). Also, thirty three percent of the vehicle operations for Oceanic 71 (reference number 630) in the last thirty days had a duty time variances exceeded thirty minutes (represented by the numeral display 632 and by the bar graph display 634).

Figure 8B:
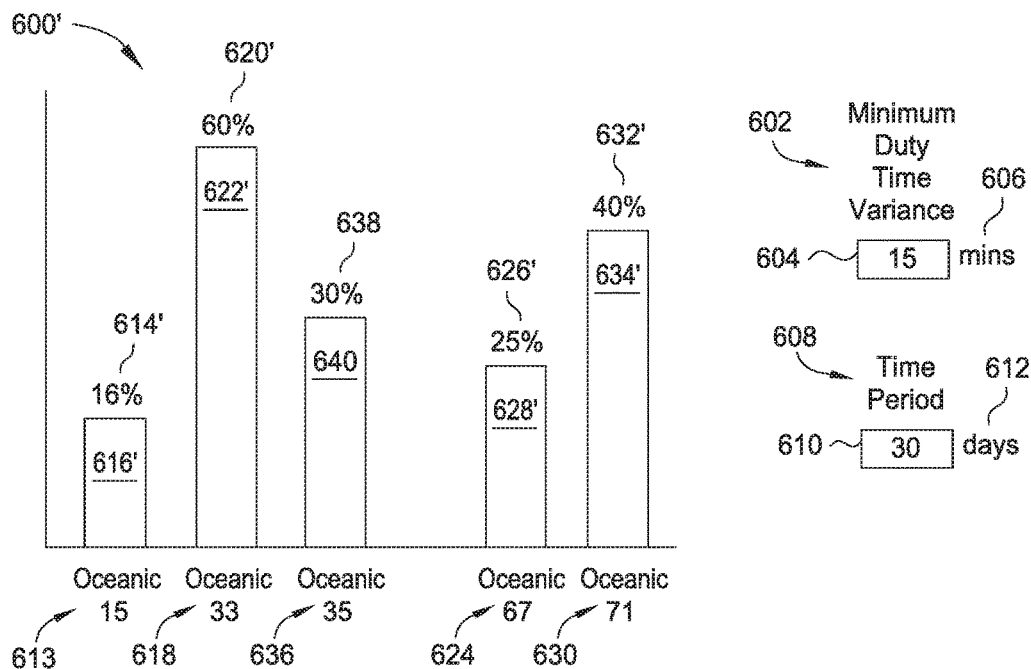
FIG. 8B is the exemplary dynamic variance report of FIG. 8A in which the variance report has been dynamically changed to show vehicle operations that included duty time variances of fifteen minutes or more over the last thirty days.

FIG. 8B illustrates an updated display of the dynamic variance report 600' after the user-adjustable criteria have been changed. For example, the input field 604 for the minimum duty time variance 602 has been changed to fifteen minutes. In the updated display of the dynamic variance report 600', the percentages for Oceanic 15 (reference number 613), Oceanic 33 (reference number 618), and Oceanic 71 (reference number 630) have increased, meaning that there were other some duty time variances of at least fifteen minutes but less than thirty minutes. The percentages for Oceanic 67 (reference number 624) have not changed, meaning that all of the duty time variances were more than thirty minutes. Also, an additional vehicle operation, Oceanic 35 (reference number 636) has been added to the dynamic variance report 600'. Thirty percent of the vehicle operations for Oceanic 35 (reference number 636) in the last thirty days had a duty time variance that exceeded fifteen minutes (represented by the numeral display 638 and by the bar graph display 640). However, Oceanic 35 (reference number 636) did not have any duty time variances in the last thirty days that exceeded thirty minutes because Oceanic 35 does not appear on the dynamic variance report 600 shown in FIG. 6A. Such a dynamic presentation of data could be used by a scheduler to set duty time buffers for various vehicle operations. For example, the scheduler could set a thirty minute buffer for Oceanic 35, which did not have any duty time variances of thirty minutes or more, and forty five minute duty time buffers for Oceanic 15, Oceanic 33, Oceanic 67, and Oceanic 71, which had duty time variances in excess of thirty minutes. In various instances, the scheduler could continue to adjust the minimum duty time variance criterion 602 (using the input field 604) to find a variance level at which most of the different flight operations have been removed from the dynamic variance report 600 and/or the number (or percentages) of instances of flight operations that exceed the specified minimum duty time criterion 602 is suitably low. The scheduler could then set the duty time buffer for the operations to be equal to this value for the minimum duty time variance criterion 602.

Figure 9A:
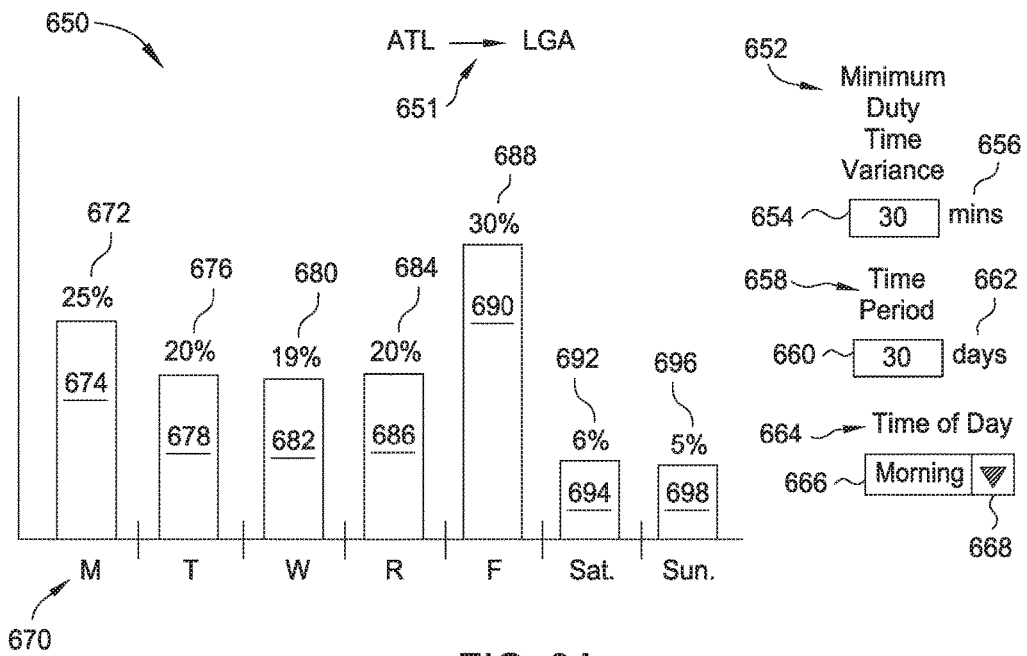
FIG. 9A is an exemplary dynamic variance report according to at least one aspect that shows morning vehicle operations from ATL to LGA that include duty time variances of thirty minutes or more in the last thirty days.

FIG. 9A illustrates a display for a dynamic variance report 650 for vehicle operations along a particular route. In this case, the route is from Hartsfield International Airport in Atlanta Ga. (ATL) to LaGuardia Airport in New York City, N.Y. (LGA) (indicated by reference number 651). The dynamic variance report 650 displays variance data for the vehicle operations based on day of the week 670. The dynamic variance report 650 includes three user-adjustable criteria. The first user-adjustable criterion is a minimum duty time variance 652 expressed in units of minutes 656. The display includes an input field 654 in which a user, using the input device(s) 306, can enter a minimum duty time variance 652 to be displayed. For example, FIG. 9A illustrates the user-adjustable criterion for minimum duty time variance 652 being set to thirty minutes, meaning that only flight segments having duty time variances of thirty minutes or more are displayed. The second user-adjustable criterion is a time period 658 for the dynamic variance report 650 expressed in units of days 662. The display includes an input field 410 in which a user, using the input device(s) 306, can enter a time period for the dynamic variance report 650. The third user-adjustable criterion is a time of day 664. The display includes a field 666 that displays the selected time of day (morning in FIG. 9A) and a drop-down icon 668 the user could select the drop-down icon 668 using a computer mouse or the like to change the selected time of day to mid day, afternoon, early evening, late evening, overnight, or the like. Based on the user-adjustable criteria, the dynamic variance report 650 shows that twenty five percent of the vehicle operations on Monday mornings in the last thirty days had duty time variances of thirty minutes or greater (indicated by the numeral 672 and the bar graph 674). Additionally, the dynamic variance report 650 shows that twenty percent of the vehicle operations on Tuesday mornings in the last thirty days had duty time variances of thirty minutes or greater (indicated by the numeral 676 and the bar graph 678). Also, the dynamic variance report 650 shows that nineteen percent of the vehicle operations on Wednesday mornings in the last thirty days had duty time variances of thirty minutes or greater (indicated by the numeral 680 and the bar graph 682). Also, the dynamic variance report 650 shows that twenty percent of the vehicle operations on Thursday mornings in the last thirty days had duty time variances of thirty minutes or greater (indicated by the numeral 684 and the bar graph 686). Also, the dynamic variance report 650 shows that thirty percent of the vehicle operations on Friday mornings in the last thirty days had duty time variances of thirty minutes or greater (indicated by the numeral 688 and the bar graph 690). Also, the dynamic variance report 650 shows that six percent of the vehicle operations on Saturday mornings in the last thirty days had duty time variances of thirty minutes or greater (indicated by the numeral 692 and the bar graph 694). Also, the dynamic variance report 650 shows that five percent of the vehicle operations on Sunday mornings in the last thirty days had duty time variances of thirty minutes or greater (indicated by the numeral 696 and the bar graph 698).

From the dynamic variance report 650, it's clear that in this instance, the duty time variances are significantly smaller on the weekends than during the weekdays. As a result, a scheduler could define a buffer for duty times for the weekend days that is different from a buffer for duty times on weekdays.

Figure 9B:
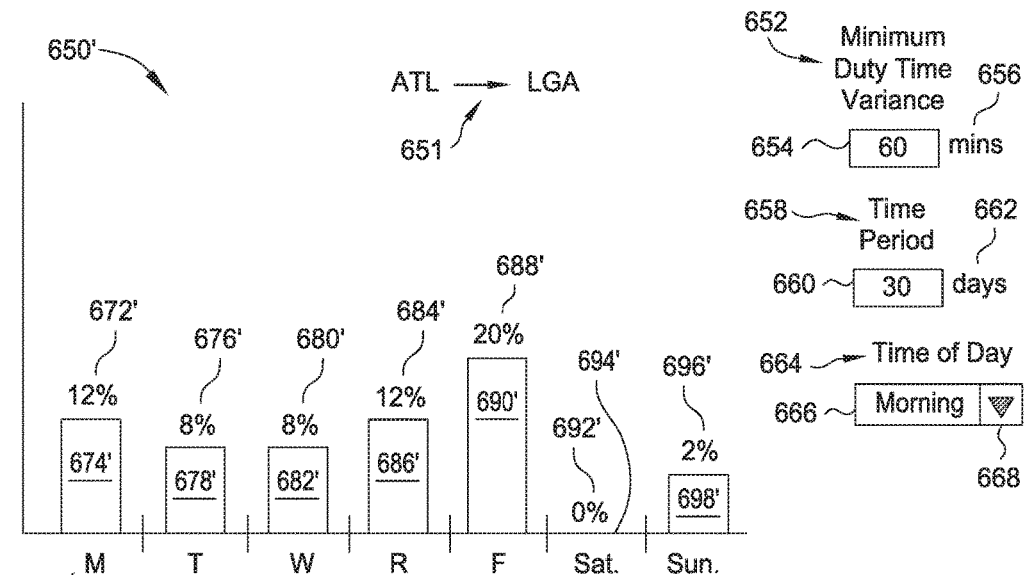
FIG. 9B is the exemplary dynamic variance report of FIG. 9A in which the display has been dynamically changed to show morning vehicle operations from ATL to LGA with duty time variances of sixty minutes or more in the last thirty days.

FIG. 9B illustrates an updated display of the dynamic variance report 650' in which the user-adjustable minimum duty time variance criterion has been changed to sixty minutes (indicated in the input field 654). In general, the numbers of vehicle operations with duty time variances that are sixty minutes or more are less than the number of vehicle of duty time variances that are thirty minutes or more. For example, the dynamic variance report 650' shows that twelve percent of the vehicle operations on Monday mornings in the last thirty days had duty time variances of sixty minutes or greater (indicated by the numeral 672' and the bar graph 674'). Additionally, the dynamic variance report 650' shows that eight percent of the vehicle operations on Tuesday mornings in the last thirty days had duty time variances of sixty minutes or greater (indicated by the numeral 676' and the bar graph 678'). Also, the dynamic variance report 650' shows that eight percent of the vehicle operations on Wednesday mornings in the last thirty days had duty time variances of sixty minutes or greater (indicated by the numeral 680' and the bar graph 682'). Also, the dynamic variance report 650' shows that twelve percent of the vehicle operations on Thursday mornings in the last thirty days had duty time variances of sixty minutes or greater (indicated by the numeral 684' and the bar graph 686'). Also, the dynamic variance report 650' shows that twenty percent of the vehicle operations on Friday mornings in the last thirty days had duty time variances of sixty minutes or greater (indicated by the numeral 688' and the bar graph 690'). Also, the dynamic variance report 650' shows that none of the vehicle operations on Saturday mornings in the last thirty days had duty time variances of sixty minutes or greater (indicated by the numeral 692' and (absent) bar graph 694'). Also, the dynamic variance report 650' shows that two percent of the vehicle operations on Sunday mornings in the last thirty days had duty time variances of sixty minutes or greater (indicated by the numeral 696' and the bar graph 698'). By comparing the dynamic variance report 650 in FIG. 9A with the updated dynamic variance report 650' shown in FIG. 9B, a scheduler could see that many of the variances that exceeded thirty minutes also exceeded 60 minutes. Thus, a buffer of thirty minutes may not be sufficient to reduce variances. Similarly, a buffer of 60 minutes may not be sufficient to reduce variances. In various aspects and/or circumstances, a scheduler could continue to adjust the user-adjustable criteria for minimum duty time variance 652 until the number of operations that exceed the variance is acceptably low. The resulting value for the user-adjustable criteria for minimum duty time variance 652 could then be used by the scheduler to assign a duty time buffer for operations from ATL to LGA.

Figure 10A:
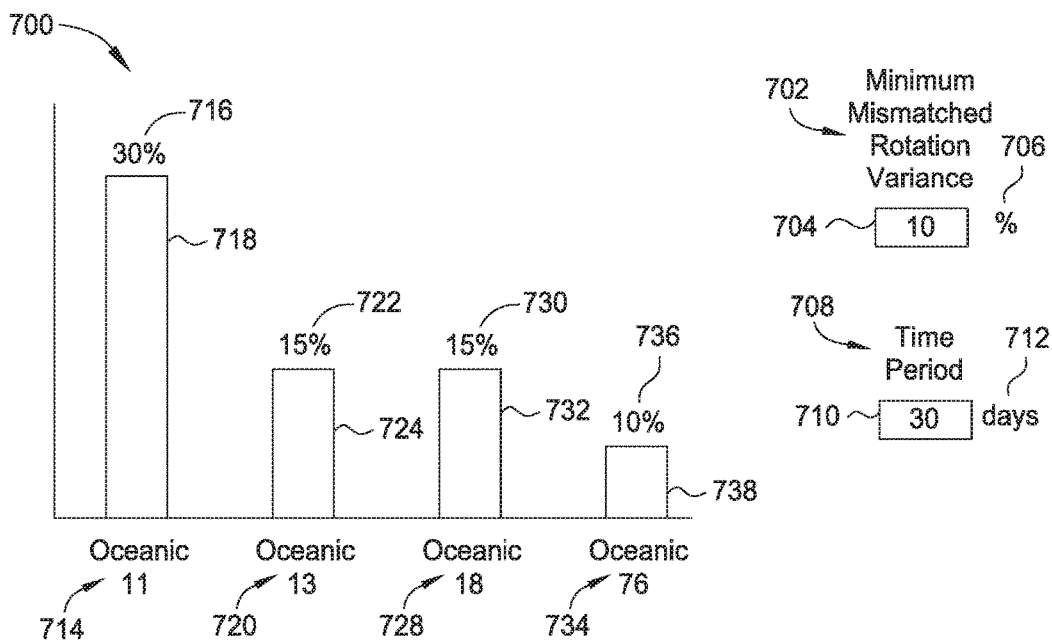
FIG. 10A is an exemplary dynamic variance report according to at least one aspect that shows vehicle operations that included mismatched rotation variances of ten percent or more over the last thirty days.

FIG. 10A depicts a display screen view of a dynamic variance report 700 according to various aspects for mismatched rotation variances for various commercial aircraft flight segments. The dynamic variance report 700 includes two user-adjustable criteria. The first user-adjustable criterion is a minimum mismatched rotation variance 702 expressed as a percentage of vehicle operations 706. The display includes an input field 704 in which a user, using the input device(s) 306, can enter a minimum mismatched rotation variance to be displayed. For example, FIG. 10A illustrates the user-adjustable criterion for minimum mismatched rotation variance 702 being set to ten percent, meaning that only flight segments having mismatched rotation variances of ten percent or more are displayed. The second user-adjustable criterion is a time period 708 for the dynamic variance report 700 expressed in units of days 712. The display includes an input field 710 in which a user, using the input device(s) 306, can enter a time period for the dynamic variance report 700. For example, FIG. 10A illustrates the user-adjustable criterion for time period 708 being set to thirty days. Based on the user-adjustable criteria for minimum mismatched rotation variance 702 and time period 708, the dynamic variance report 700 displays mismatched rotation variance information for four flight segments for Oceanic Airlines. Thirty percent of the vehicle operations for Oceanic 11 (reference number 714) in the last thirty days (i.e., flight segments) had a mismatched rotation variance. Here, the thirty percent of vehicle operations is represented both by a numeral display 716 and by a bar graph 718. Also, fifteen percent of the vehicle operations for Oceanic 13 (reference number 720) in the last thirty days had a mismatched rotation variance (represented by the numeral display 722 and by the bar graph display 724). Also, fifteen percent of the vehicle operations for Oceanic 18 (reference number 728) in the last thirty days had a mismatched rotation variance (represented by the numeral display 730 and by the bar graph display 732). Also, ten percent of the vehicle operations for Oceanic 76 (reference number 734) in the last thirty days had a mismatched rotation variance (represented by the numeral display 736 and by the bar graph display 738).

Figure 10B:
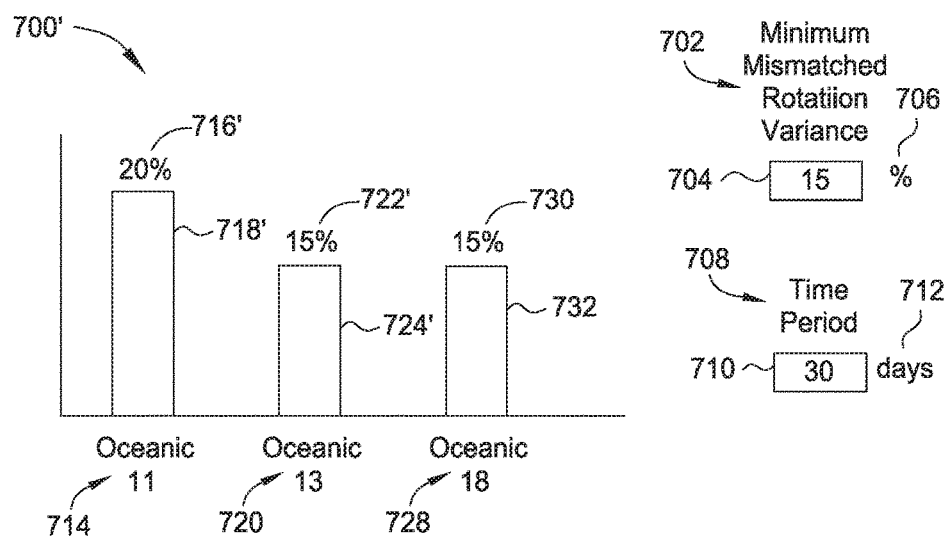
FIG. 10B is the exemplary dynamic variance report of FIG. 10A in which the variance report has been dynamically changed to show vehicle operations that included mismatched rotation variances of fifteen percent or more over the last thirty days.

FIG. 10B illustrates an updated display of the dynamic variance report 700' after the user-adjustable criteria have been changed. For example, the input field 704 for the minimum mismatched rotation variance 702 has been changed to fifteen percent. In the updated display of the dynamic variance report 700', the percentages for Oceanic 11 (reference number 714), Oceanic 13 (reference number 720), and Oceanic 18 (reference number 728) are the same because each flight segment had mismatched rotation variances of at least fifteen percent. However, Oceanic 76 (reference number 734) does not appear in the updated dynamic variance report 700' because fewer than fifteen percent of the flight segments had mismatched rotation variances. Such a dynamic presentation of data could be used by a scheduler to identify vehicle operations with significant mismatched rotation problems.

Figure 11A:
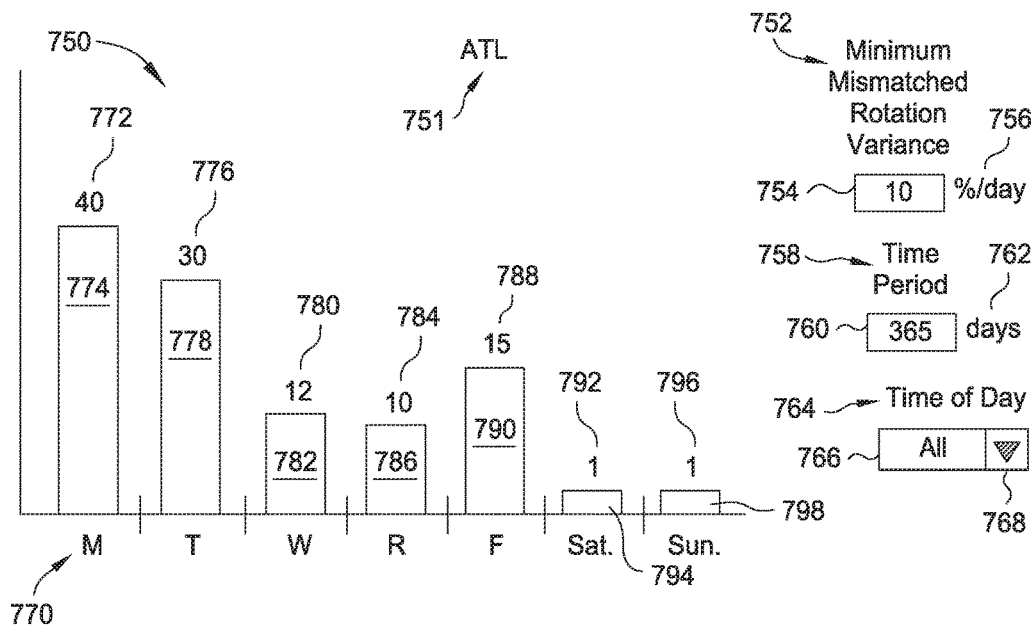
FIG. 11A is an exemplary dynamic variance report according to at least one aspect that shows days with vehicle operations at ATL that include mismatched rotation variances of ten percent per day or more in the last three hundred and sixty five days.

FIG. 11A illustrates a display for a dynamic variance report 750 for vehicle operations at Hartsfield International Airport in Atlanta Ga. (ATL) (indicated by reference number 751). The dynamic variance report 750 displays variance data for the vehicle operations based on day of the week 770. The dynamic variance report 750 includes three user-adjustable criteria. The first user-adjustable criterion is a minimum mismatched rotation variance 752 expressed as a percentage per day 756. The display includes an input field 754 in which a user, using the input device(s) 306, can enter a minimum mismatched rotation variance 752 to be displayed. For example, FIG. 11A illustrates the user-adjustable criterion for minimum mismatched rotation variance 752 being set to ten percent per day, meaning that only days that have more than ten percent of flights having mismatched rotations are displayed. The second user-adjustable criterion is a time period 758 for the dynamic variance report 750 expressed in units of days 762. The display includes an input field 760 in which a user, using the input device(s) 306, can enter a time period for the dynamic variance report 750. Here, the time period has been set to three hundred and sixty five days. The third user-adjustable criterion is a time of day 764. The display includes a field 766 that displays the selected time of day ("all" in FIG. 11A) and a drop-down icon 768. The user could select the drop-down icon 768 using a computer mouse or the like to change the selected time of day to mid day, afternoon, early evening, late evening, overnight, or the like. Based on the user-adjustable criteria, the dynamic variance report 750 shows that forty Mondays in the last three hundred and sixty five days had mismatched rotation variances in excess of ten percent at ATL (indicated by the numeral 772 and the bar graph 774). Also, the dynamic variance report 750 shows that thirty Tuesdays in the last three hundred and sixty five days had mismatched rotation variances in excess of ten percent at ATL (indicated by the numeral 776 and the bar graph 778). Also, the dynamic variance report 750 shows that twelve Wednesdays in the last three hundred and sixty five days had mismatched rotation variances in excess of ten percent at ATL (indicated by the numeral 780 and the bar graph 782). Also, the dynamic variance report 750 shows that ten Thursdays in the last three hundred and sixty five days had mismatched rotation variances in excess of ten percent at ATL (indicated by the numeral 784 and the bar graph 786). Also, the dynamic variance report 750 shows that fifteen Fridays in the last three hundred and sixty five days had mismatched rotation variances in excess of ten percent at ATL (indicated by the numeral 788 and the bar graph 790). Also, the dynamic variance report 750 shows that one Saturday in the last three hundred and sixty five days had mismatched rotation variances in excess of ten percent at ATL (indicated by the numeral 792 and the bar graph 794). Also, the dynamic variance report 750 shows that one Sunday in the last three hundred and sixty five days had mismatched rotation variances in excess of ten percent at ATL (indicated by the numeral 796 and the bar graph 798).

From the dynamic variance report 750, it's clear that in this instance, the mismatched rotation variances are significantly smaller on the weekends than during the weekdays. As a result, a scheduler could put in place more resources (e.g., back up flight crews) at ATL during the week than on the weekend.

Figure 11B:
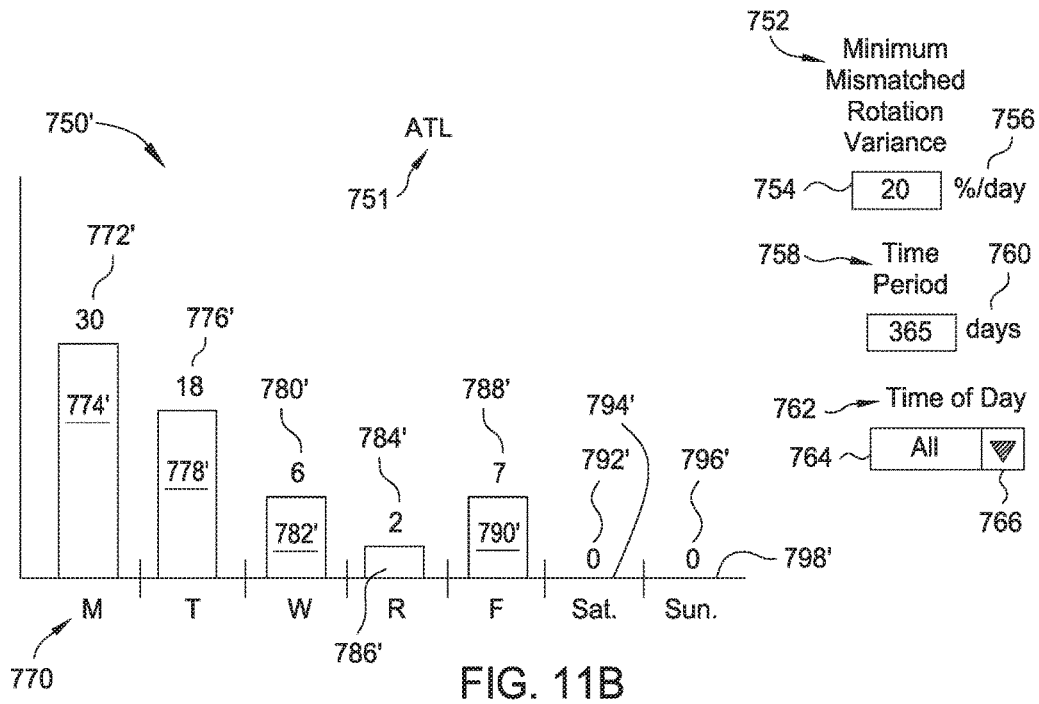
FIG. 11B is the exemplary dynamic variance report of FIG. 11A in which the display has been dynamically changed to show days with vehicle operations at ATL that include mismatched rotation variances of twenty percent per day or more in the last three hundred and sixty five days.

FIG. 11B illustrates an updated display of the dynamic variance report 750' for mismatched rotations in which the user-adjustable minimum mismatched rotation variance criterion has been changed to twenty percent per day (indicated in the input field 754). In general, the number of days with mismatched rotation variances at ATL in excess of twenty percent is less than the number of days with mismatched rotation variances that are ten percent per day. For example, the dynamic variance report 750' shows that thirty Mondays in the last three hundred and sixty five days had mismatched rotation variances in excess of twenty percent at ATL (indicated by the numeral 772' and the bar graph 774'). Also, the dynamic variance report 750' shows that eighteen Tuesdays in the last three hundred and sixty five days had mismatched rotation variances in excess of twenty percent at ATL (indicated by the numeral 776' and the bar graph 778'). Also, the dynamic variance report 750' shows that six Wednesdays in the last three hundred and sixty five days had mismatched rotation variances in excess of twenty percent at ATL (indicated by the numeral 780' and the bar graph 782'). Also, the dynamic variance report 750' shows that two Thursdays in the last three hundred and sixty five days had mismatched rotation variances in excess of twenty percent at ATL (indicated by the numeral 784' and the bar graph 786'). Also, the dynamic variance report 750' shows that seven Fridays in the last three hundred and sixty five days had mismatched rotation variances in excess of twenty percent at ATL (indicated by the numeral 788' and the bar graph 790'). Also, the dynamic variance report 750' shows that no Saturdays in the last three hundred and sixty five days had mismatched rotation variances in excess of twenty percent at ATL (indicated by the numeral 792' and the absent bar graph 794'). Also, the dynamic variance report 750' shows that no Sundays in the last three hundred and sixty five days had mismatched rotation variances in excess of twenty percent at ATL (indicated by the numeral 796' and the bar graph 798').

The exemplary dynamic variance reports outline certain types of variance reports that could be used in the aviation industry. Other types of dynamic variance reports could also be provided for the aviation industry or for other types of vehicle operations. Additionally, the formats of the variance reports, including the presentation of the numbers of instances of variances as absolute numbers or percentages and graphical presentations as bar graphs, are for illustration purposes only. Other presentations of variance data, including different numeric presentation and different graphical presentations of are contemplated. The dynamic variance reports enable a vehicle operations scheduler to understand certain variances and trends in those variances. The scheduler can then use that understanding to apply suitable buffers to the different vehicle operations that result in the actual vehicle operations being closer to the planned vehicle operations.

The descriptions of the various aspects have been presented for purposes of illustration, but are not intended to be exhaustive or limited to the aspects disclosed. Many modifications and variations will be apparent to those of ordinary skill in the art without departing from the scope and spirit of the described aspects. The terminology used herein was chosen to best explain the principles of the aspects, the practical application or technical improvement over technologies found in the marketplace, or to enable others of ordinary skill in the art to understand the aspects disclosed herein.

Aspects described herein may take the form of an entirely hardware aspect, an entirely software aspect (including firmware, resident software, micro-code, etc.) or an aspect combining software and hardware aspects that may all generally be referred to herein as a "circuit," "module" or "system."

Various aspects may be a system, a method, and/or a computer program product. The computer program product may include a computer readable storage medium (or media) having computer readable program instructions thereon for causing a processor to carry out aspects described herein.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of various aspects may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some aspects, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects described herein.

Aspects are described herein with reference to flowchart illustrations and/or block diagrams of methods, apparatus (systems), and computer program products according to aspects. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various aspects. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Aspects may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud computing resources are provided to a user on a pay-per-use basis, where users are charged only for the computing resources actually used (e.g. an amount of storage space consumed by a user or a number of virtualized systems instantiated by the user). A user can access any of the resources that reside in the cloud at any time, and from anywhere across the Internet. In context of aspects described herein, a user may access applications (e.g., applications that generate and output dynamic variance reports) or related data available in the cloud. For example, the dynamic variance report application could execute on a computing system in the cloud and operate on the planned and actual vehicle operation data to generate and output dynamic variance reports. In such a case, the dynamic variance application could store the dynamic variance reports at a storage location in the cloud. Doing so allows a user to access this information from any computing system attached to a network connected to the cloud (e.g., the Internet).

While the foregoing is directed to aspects, other and further aspects may be devised without departing from the basic scope thereof, and the scope thereof is determined by the claims that follow.

What is claimed is:

1. A computer-implemented method, comprising:
   storing, in a non-transitory computer-readable medium, planned vehicle operations data corresponding to a plurality of different planned vehicle operations;
   storing, in the non-transitory computer-readable medium, actual vehicle operations data for multiple instances of at least one planned vehicle operation of the plurality of different planned vehicle operations;
   calculating at least one variance for at least one personnel time limit criterion for the multiple instances of the at least one planned vehicle operation, based on one or more differences between the actual vehicle operations data and the planned vehicle operations data;
   receiving, via an electronic input device, a user input indicating a value for at least one user-adjustable criterion; and
   displaying, via a display device, at least one electronic dynamic variance report based on the calculated at least one variance and based on the value for the at least one user-adjustable criterion.

2. The computer-implemented method of claim 1, further comprising:
   receiving, via the electronic input device, a second user input of a change to the at least one user-adjustable criterion;
   responsive to the change, updating the at least one dynamic variance report based on the calculated at least one variance and based on the changed at least one user-adjustable criterion; and
   displaying, via the display device, the updated at least one dynamic variance report.

3. The computer-implemented method of claim 2, wherein the vehicle operations are flight segments for commercial aircraft, wherein the at least one variance comprises block time variances for the flight segments, wherein the at least one user-adjustable criterion comprises a user-adjustable variance threshold, and wherein the variance report dynamically changes from a first display of flight segments that exceed a first user-adjustable variance threshold to a second display of flight segments that exceed a second user-adjustable variance threshold upon the user-adjustable variance threshold being changed from the first variance threshold to the second variance threshold.

4. The computer-implemented method of claim 2, wherein the vehicle operations are multiple instances of a flight segment, wherein the at least one variance comprises block time variances for the multiple instances, wherein the at least one user-adjustable criterion comprises a user-adjustable variance threshold, and wherein the variance report dynamically changes from a first display of instances of the flight segment that exceed a first user-adjustable variance threshold to a second display of instances of the flight segment that exceed a second user-adjustable variance threshold upon the user-adjustable variance threshold being changed from the first variance threshold to the second variance threshold.

5. The computer-implemented method of claim 2, wherein the vehicle operations are flight segments for commercial aircraft, wherein the at least one variance comprises connection time variances for flight crews for flight segment pairs, wherein the at least one user-adjustable criterion comprises a user-adjustable variance threshold, and wherein the variance report dynamically changes from a first display of flight segments that exceed a first user-adjustable variance threshold to a second display of flight segments that exceed a second user-adjustable variance threshold upon the user-adjustable variance threshold being changed from the first variance threshold to the second variance threshold.

6. The computer-implemented method of claim 2, wherein the vehicle operations are flight segments for commercial aircraft, wherein the at least one variance time comprises connection time variances at particular airports, wherein the at least one user-adjustable criterion comprises a user-adjustable variance threshold, and wherein the variance report dynamically changes from a first display of flight segments that exceed a first user-adjustable variance threshold to a second display of flight segments that exceed a second user-adjustable variance threshold upon the user-adjustable variance threshold being changed from the first variance threshold to the second variance threshold.

7. The computer-implemented method of claim 2, wherein the vehicle operations are flight segments for commercial aircraft, wherein the at least one variance comprises duty time variances for flight crews for itineraries of flight segments, wherein the at least one user-adjustable criterion comprises a user-adjustable variance threshold, and wherein the variance report dynamically changes from a first display of flight segments that exceed a first user-adjustable variance threshold to a second display of flight segments that exceed a second user-adjustable variance threshold upon the user-adjustable variance threshold being changed from the first variance threshold to the second variance threshold.

8. The computer-implemented method of claim 2, wherein the vehicle operations are flight segments for commercial aircraft, wherein the at least one variance comprises instances in which an aircraft does not operate a pre-planned itinerary of flight segments, wherein the at least one user-adjustable criterion comprises a user-adjustable number of instances, and wherein the variance report dynamically changes from a first display of flight segments that exceed a first user-adjustable variance threshold to a second display of flight segments that exceed a second user-adjustable variance threshold upon the user-adjustable variance threshold being changed from the first variance threshold to the second variance threshold.

9. The computer-implemented method of claim 2, wherein the vehicle operations are flight segments for commercial aircraft, wherein the at least one variance comprises instances in which aircraft departing from a particular airport do not operate a preplanned flight segment, wherein the at least one user-adjustable criterion comprises a user-adjustable number of instances, and wherein the variance report dynamically changes from a first display of flight segments that exceed a first user-adjustable variance threshold to a second display of flight segments that exceed a second user-adjustable variance threshold upon the user-adjustable variance threshold being changed from the first variance threshold to the second variance threshold.

10. The computer-implemented method of claim 1, wherein the at least one user-adjustable criterion comprises at least one of: time of day, month, year, and season.

11. A computer program product for generating dynamic reports related to vehicle operations, the computer program product comprising:
a non-transitory computer-readable storage medium having computer-readable program code embodied therewith, the computer-readable program code executable by one or more computer processors to:
store, in a data structure, planned vehicle operations data corresponding to a plurality of different planned vehicle operations;
store, in the data structure, actual vehicle operations data for multiple instances of at least one planned vehicle operation of the plurality of different planned vehicle operations;
calculate at least one variance for at least one personnel time limit criterion for the multiple instances of the at least one planned vehicle operation, based on the actual vehicle operations data and planned vehicle operations data;
receive a user input indicating a value for at least one user-adjustable criterion; and
display, via a display device communicatively coupled with the one or more computer processors, at least one dynamic variance report based on the calculated at least one variance and based on the value for the at least one user-adjustable criterion.

12. The computer program product of claim 11, wherein the computer-readable program code is further executable to:
receive a change to the at least one user-adjustable criterion;
responsive to the change, update the at least one dynamic variance report based on the calculated at least one variance and based on the changed at least one user-adjustable criterion; and
display, via the display device, the updated at least one dynamic variance report.

13. The computer program product of claim 11, wherein the at least one user-adjustable criterion comprises at least one of: time of day, month, year, and season.

14. A system, comprising:
a data structure on a non-transitory computer-readable medium storing (i) planned vehicle operations data related to a plurality of different planned vehicle operations and (ii) actual vehicle operations data for multiple instances of at least one planned vehicle operation of the plurality of different planned vehicle operations;
at least one input device configured to receive a value for at least one user-adjustable criterion;
a display device; and
a processor in communication with the data structure, the at least one input device, and the display device, the processor configured to:
retrieve the actual vehicle operations data and the planned vehicle operations data from the data structure;
calculate at least one variance for at least one personnel time limit criterion for the multiple instances of the at least one planned vehicle operation, based on one or more differences between the actual vehicle operations data and the planned vehicle operations data; and
output to the display device a first at least one dynamic variance report based on the calculated at least one variance and based on the value for the at least one user-adjustable criterion.

15. The system of claim 14, wherein the processor is further configured to:
  receive a change to the at least one user-adjustable criterion from the at least one input device; and
  responsive to the change, output to the display device a second at least one dynamic variance report based on the calculated at least one variance and based on the changed at least one user-adjustable criterion.

16. The system of claim 15, wherein the vehicle operations are flight segments for commercial aircraft, wherein the at least one variance comprises block time variances for the flight segments, wherein the at least one user-adjustable criterion comprises a user-adjustable variance threshold, and wherein the variance report dynamically changes from a first display of flight segments that exceed a first user-adjustable variance threshold to a second display of flight segments that exceed a second user-adjustable variance threshold upon the user-adjustable variance threshold being changed from the first variance threshold to the second variance threshold.

17. The system of claim 15, wherein the vehicle operations are multiple instances of a flight segment, wherein the at least one variance comprises block time variances for the multiple instances, wherein the at least one user-adjustable criterion comprises a user-adjustable variance threshold, and wherein the variance report dynamically changes from a first display of instances of the flight segment that exceed a first user-adjustable variance threshold to a second display of instances of the flight segment that exceed a second user-adjustable variance threshold upon the user-adjustable variance threshold being changed from the first variance threshold to the second variance threshold.

18. The system of claim 15, wherein the vehicle operations are flight segments for commercial aircraft, wherein the at least one variance comprises connection time variances for flight crews for flight segment pairs, wherein the at least one user-adjustable criterion comprises a user-adjustable variance threshold, and wherein the variance report dynamically changes from a first display of flight segments that exceed a first user-adjustable variance threshold to a second display of flight segments that exceed a second user-adjustable variance threshold upon the user-adjustable variance threshold being changed from the first variance threshold to the second variance threshold.

19. The system of claim 15, wherein the vehicle operations are flight segments for commercial aircraft, wherein the at least one variance time comprises connection time variances at particular airports, wherein the at least one user-adjustable criterion comprises a user-adjustable variance threshold, and wherein the variance report dynamically changes from a first display of flight segments that exceed a first user-adjustable variance threshold to a second display of flight segments that exceed a second user-adjustable variance threshold upon the user-adjustable variance threshold being changed from the first variance threshold to the second variance threshold.

20. The system of claim 15, wherein the vehicle operations are flight segments for commercial aircraft, wherein the at least one variance comprises duty time variances for flight crews for itineraries of flight segments, wherein the at least one user-adjustable criterion comprises a user-adjustable variance threshold, and wherein the variance report dynamically changes from a first display of flight segments that exceed a first user-adjustable variance threshold to a second display of flight segments that exceed a second user-adjustable variance threshold upon the user-adjustable variance threshold being changed from the first variance threshold to the second variance threshold.

21. The system of claim 15, wherein the vehicle operations are flight segments for commercial aircraft, wherein the at least one variance comprises instances in which an aircraft does not operate a pre-planned itinerary of flight segments, wherein the at least one user-adjustable criterion comprises a user-adjustable number of instances, and wherein the variance report dynamically changes from a first display of flight segments that exceed a first user-adjustable variance threshold to a second display of flight segments that exceed a second user-adjustable variance threshold upon the user-adjustable variance threshold being changed from the first variance threshold to the second variance threshold.

22. The system of claim 15, wherein the vehicle operations are flight segments for commercial aircraft, wherein the at least one variance comprises instances in which aircraft departing from a particular airport do not operate a preplanned flight segment, wherein the at least one user-adjustable criterion comprises a user-adjustable number of instances, and wherein the variance report dynamically changes from a first display of flight segments that exceed a first user-adjustable variance threshold to a second display of flight segments that exceed a second user-adjustable variance threshold upon the user-adjustable variance threshold being changed from the first variance threshold to the second variance threshold.

23. The system of claim 14, wherein the at least one user-adjustable criterion comprises at least one of: time of day, month, year, and season.

24. The computer-implemented method of claim 1, wherein the at least one user-adjustable criterion comprises a first time-based criterion.

* * * * *